(12) United States Patent
Maehara et al.

(10) Patent No.: US 7,188,600 B1
(45) Date of Patent: Mar. 13, 2007

(54) INTERNAL COMBUSTION ENGINE CAPABLE OF SELECTIVELY RESTING CERTAIN CYLINDERS DURING LOW-LOAD OPERATION, AND METHOD OF USING SAME

(75) Inventors: Hayato Maehara, Saitama (JP); Shinji Saito, Saitama (JP); Takaaki Tsukui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/220,857

(22) Filed: Sep. 7, 2005

(30) Foreign Application Priority Data

Sep. 7, 2004 (JP) ............................. 2004-259615

(51) Int. Cl.
*F02D 13/06* (2006.01)
*F02B 13/00* (2006.01)

(52) U.S. Cl. .................................. 123/198 F; 123/583

(58) Field of Classification Search ............ 123/198 F, 123/583
See application file for complete search history.

(56) References Cited

U.S. PATENT DOCUMENTS

| | | | | |
|---|---|---|---|---|
| 4,204,514 | A | * | 5/1980 | Ishida ..................... 123/198 F |
| 4,455,984 | A | * | 6/1984 | Merlini et al. ........... 123/198 F |
| 4,587,936 | A | | 5/1986 | Matsuura et al. |
| 5,361,734 | A | | 11/1994 | Shirai |
| 5,562,086 | A | * | 10/1996 | Asada et al. ............. 123/198 F |
| 5,636,609 | A | | 6/1997 | Fujiyoshi |
| 5,758,612 | A | | 6/1998 | Tsuzuku et al. |
| 2003/0062019 | A1 | * | 4/2003 | Schaefer-Siebert ...... 123/198 F |
| 2004/0200445 | A1 | | 10/2004 | Tsukui et al. |
| 2004/0237934 | A1 | | 12/2004 | Tsukui et al. |

FOREIGN PATENT DOCUMENTS

| | | |
|---|---|---|
| EP | 0703357 | 3/1996 |
| EP | 1462622 | 9/2004 |
| EP | 1462644 | 9/2004 |
| JP | 58035244 | 3/1983 |
| JP | 60228737 | 11/1985 |
| JP | 08-105337 | 4/1996 |
| JP | 08-319811 | 12/1996 |
| SU | 1118781 A | * 10/1984 |

* cited by examiner

*Primary Examiner*—Noah P. Kamen
(74) *Attorney, Agent, or Firm*—Carrier, Blackman & Associates, P.C.; William D. Blackman; Joseph P. Carrier

(57) ABSTRACT

An internal combustion engine incorporating rest cylinders is provided which does not need a high response performance when operating a throttle valve and which can eliminate engine output variations as the number of operable cylinders changes. In the internal combustion engine, some of a plurality of cylinders is configured to rest during normal operation of the engine. The cylinders are divided into a plurality of cylinder groups, and each of the cylinders is provided with an independent throttle valve. An ECU for increasing the number of operative cylinder groups according to at least the throttle handgrip opening is provided. Also provided are motors for bringing the throttle valves in the cylinder in the rest state into a fully closed state on the basis of each cylinder group, a throttle valve position sensor, and the like.

19 Claims, 12 Drawing Sheets

CHANGEOVER CONTROL (REST → OPERATION)

S11: GRIP OPENING θg

S12: THROTTLE VALVE → OPENED

S13: VALVE OPERATION

S14: START FUEL INJECTION

INTERNAL COMBUSTION ENGINE CAPABLE OF SELECTIVELY RESTING CERTAIN CYLINDERS DURING LOW-LOAD OPERATION, AND METHOD OF USING SAME

CROSS-REFERENCE TO RELATED APPLICATIONS

The present invention claims priority under 35 USC 119 based on Japanese patent application No. 2004-259615, filed on Sep. 7, 2004. The subject matter of this priority document is incorporated by reference herein.

BACKGROUND OF THE INVENTION

1. Field of the Invention

The present invention relates to a multi-cylinder internal combustion engine, in which at least some of a plurality of cylinders are capable of selectively resting during engine operation under low load.

2. Description of the Background Art

Among multiple-cylinder internal combustion engines, an engine is known in which some of the cylinders selectively rest, or become non-operative, during normal engine operation under certain low-load conditions. With some of the cylinders being permitted to rest during normal engine operation, it is possible to obtain an improvement in fuel consumption at the time of a low-load operation or the like, and also to produce extra power when needed, by operating all the cylinders at the time of a high-load operation. Specifically, there is a known system in which an engine control is performed that permits an increase the number of operating cylinders from two cylinders to three cylinders and, further, to four cylinders attendant on the transition from a low-load operation to a high-load operation. Such an engine is disclosed, for example, in Japanese Laid-open Patent publication No. Hei 08-105337.

In Japanese Laid-open Patent publication No. Hei 08-105337, an ignition-retarding operation is carried out, for suppressing a forward surge, arising from an increase in engine torque, which would otherwise be experienced at the time of changeover at a time when a cylinder transitions from a resting mode to an operating mode. It has become apparent, however, that control of the intake air quantity is effective for obtaining a further suppression of output variation during transitional periods. However, in the case of controlling the intake air quantity by using a single throttle valve, a high response performance is required for driving the throttle valve, at the time of changing over the number of cylinders. As a result, manufacturing costs are increased in order to realize the high performance response. In addition, in order to control the intake quantities for a plurality of cylinders by use of a single throttle valve, a complicated control system is needed.

In view of the foregoing, it is an object of the present invention to provide an internal combustion engine which is capable of selectively resting some of the engine cylinders, which does not need a high performance response in operating throttle valves, and which can eliminate a step change in engine output at the time of changing the number of operating cylinders.

SUMMARY OF THE INVENTION

In order to attain the above object, a first aspect of the invention resides in an internal combustion engine incorporating a cylinder rest procedure in which one or more of a plurality of cylinders are selectively permitted to rest, or become non-operative, during operation of the engine. The invention is characterized in that all the cylinders are divided into a plurality of cylinder groups, and each of the cylinders is provided with an independent throttle valve (for example, the throttle valve TH in the illustrative embodiment described herein). In addition, a cylinder number control unit (for example, the ECU 70 in the illustrative embodiment described herein) for selectively increasing the number of the operative cylinder groups according to at least a throttle operation variable (for example, the handgrip opening θg in the illustrative embodiment described herein) is provided. A throttle valve control mechanism (for example, the motors 21A, 21B, the throttle valve position sensor 22, etc. in the illustrative embodiment described herein) actuates the throttle valve(s) of the resting cylinder(s) for movement between a fully open and closed position, and is provided for each cylinder group.

With such a configuration, by using the independent throttle valves, an independent throttle valve control is performed on the basis of each cylinder group. In addition, the need for performing an engine output surge suppressing control, by use of other controlled variable(s), is eliminated.

A second aspect of the invention is characterized in that the cylinder number control unit increases the number of the operative cylinder groups when the engine speed is not less than a predetermined value (for example, the threshold value α in the illustrative embodiment described herein) when at least some of the cylinder groups are in the resting state.

With such a configuration, the number of operating cylinders can be varied, not only according to the throttle opening, but also according to the engine speed.

A third aspect of the invention is characterized in that each cylinder has four or more valves (for example, the intake valves 461, 462, and exhaust valves 471, 472 in the illustrative embodiment described herein). A valve stop mechanism (for example, the valve stop mechanism 63 and the valve stop mechanism 69 in the illustrative embodiment described herein) is provided for at least some of the valves of the cylinder. The valve stop mechanism produces a cylinder resting state by effecting an all valve resting condition, where all the valves of the cylinder are resting. In addition, a partial valve stop, or rest, operation can be conducted by bringing some of the valves of each cylinder into a resting state according to the engine speed.

With such a configuration, a temporary interruption of cylinder operation can be realized by operating the valve stop mechanism on all valves of a cylinder. In addition, it is possible to change the number of valves stopped on a given cylinder, according to the engine speed.

A fourth aspect of the invention is characterized in that at the time of a partial valve rest, adjacent exhaust valves (for example, the exhaust valves 471 and 472 in the illustrative embodiment described herein) in two adjacent cylinders are selected as operative valves, and an exhaust device (for example, a secondary air introduction valve AI in the illustrative embodiment described herein) is provided between said adjacent exhaust valves.

A fifth aspect of the invention is characterized in that in a four cylinder engine, during engine operation the number of operating cylinders is increased from two cylinders, to three cylinders, and then to four cylinders, attendant on an increase in throttle operation by the vehicle operator.

With such a configuration, it is possible to increase the number of operating cylinders by adding the operation of one cylinder at a time, and thereby to operate in a region in which the load factor of each cylinder is high.

According to the first aspect of the invention, an independent throttle valve control can be performed on the basis of each cylinder group by use of independent throttle valves, so that the need for a high response performance in driving the throttle valves is eliminated. Additionally, engine output variations, especially step increases in engine output at the time of changing over the number of operative cylinders, can be suppressed. In addition, the need to perform an output variation suppressing control by other controlled variable(s) is eliminated, and the control is simplified.

Further, since the number of cylinders is varied based on at least a throttle operation variable, the fuel consumption can be improved while achieving an output demanded by the driver, by reading the driver's intention from the controlled variable.

According to the second aspect of the invention, the number of cylinders can be varied according to not only the throttle operation but also the engine speed, so that the load factor of each cylinder can be enhanced appropriately, and compatibility between engine output and fuel consumption can be achieved.

In addition, the number of operative cylinders is large in the region where the throttle operation variable is low and the engine speed is high, i.e., at the time of engine brake or the like, so that an appropriate engine brake can be secured.

According to the third aspect of the invention, cylinder stop, or rest, can be realized by effecting valve stop for all valves of a cylinder, so that the oil pumping loss can be reduced, and an improvement in fuel consumption can be obtained. In addition, since the number of valves can be changed between rest and operational according to the engine speed, the engine output can be made appropriate to the requirements of the operator. Additionally, since each cylinder group is provided with the throttle valve control mechanism, engine output variations at the time of changing over the valves can be suppressed.

According to the fourth aspect of the invention, intake air can be introduced into the cylinder by resting the intake valve on one side of the cylinder, so that an air swirl flow pattern can be generated within the cylinder, resulting in an improvement in fuel consumption. In addition, the layout position of the exhaust device can be made compact.

According to the fifth aspect of the invention, it is possible to increase the number of cylinders from two cylinders by one cylinder at a time, and to operate in the region where the load factor of each cylinder is high, so that an improvement in fuel consumption is obtained.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

Figure 1:
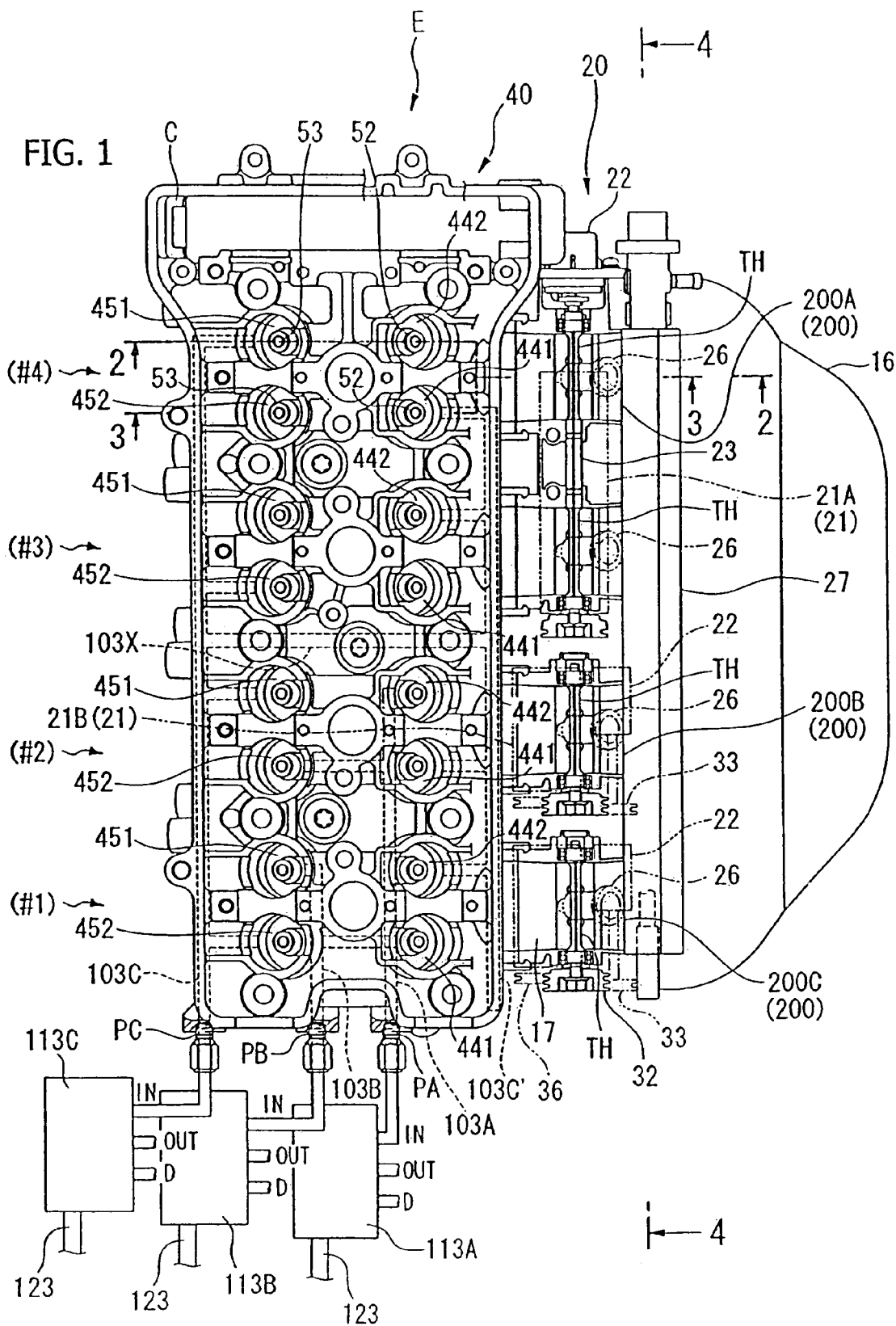
FIG. 1 is a top plan view of a major part of a four cylinder engine of one embodiment of the present invention, showing a cam chain case disposed at one end of the cylinder block, and oil pressure control valves disposed at the opposed end of the cylinder block.
Figure 2:
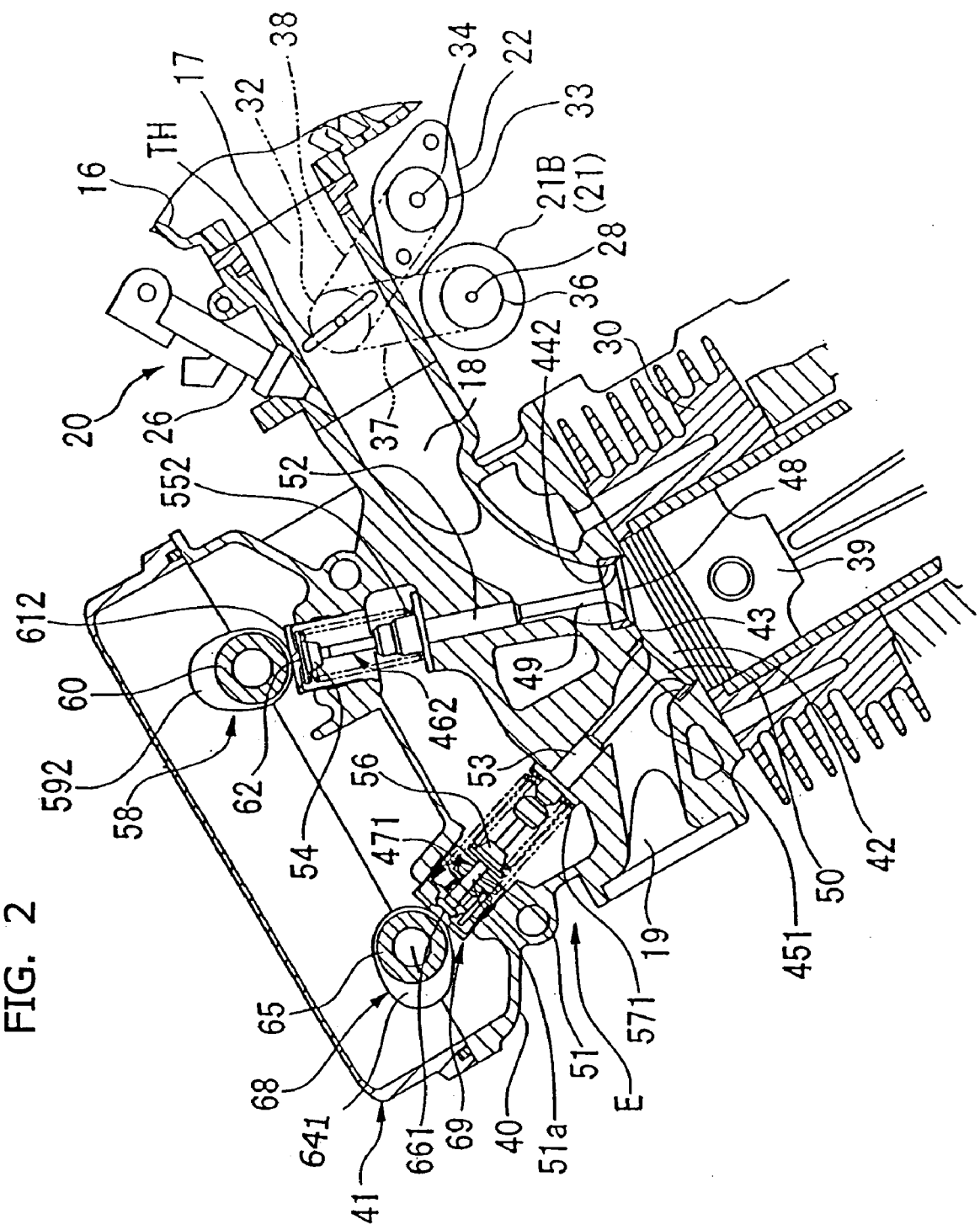
FIG. 2 is a sectional view of the engine along line 2—2 of FIG. 1 showing the number four cylinder of the engine in which a first exhaust valve includes a valve stop mechanism, and a second intake valve is formed conventionally.
Figure 3:
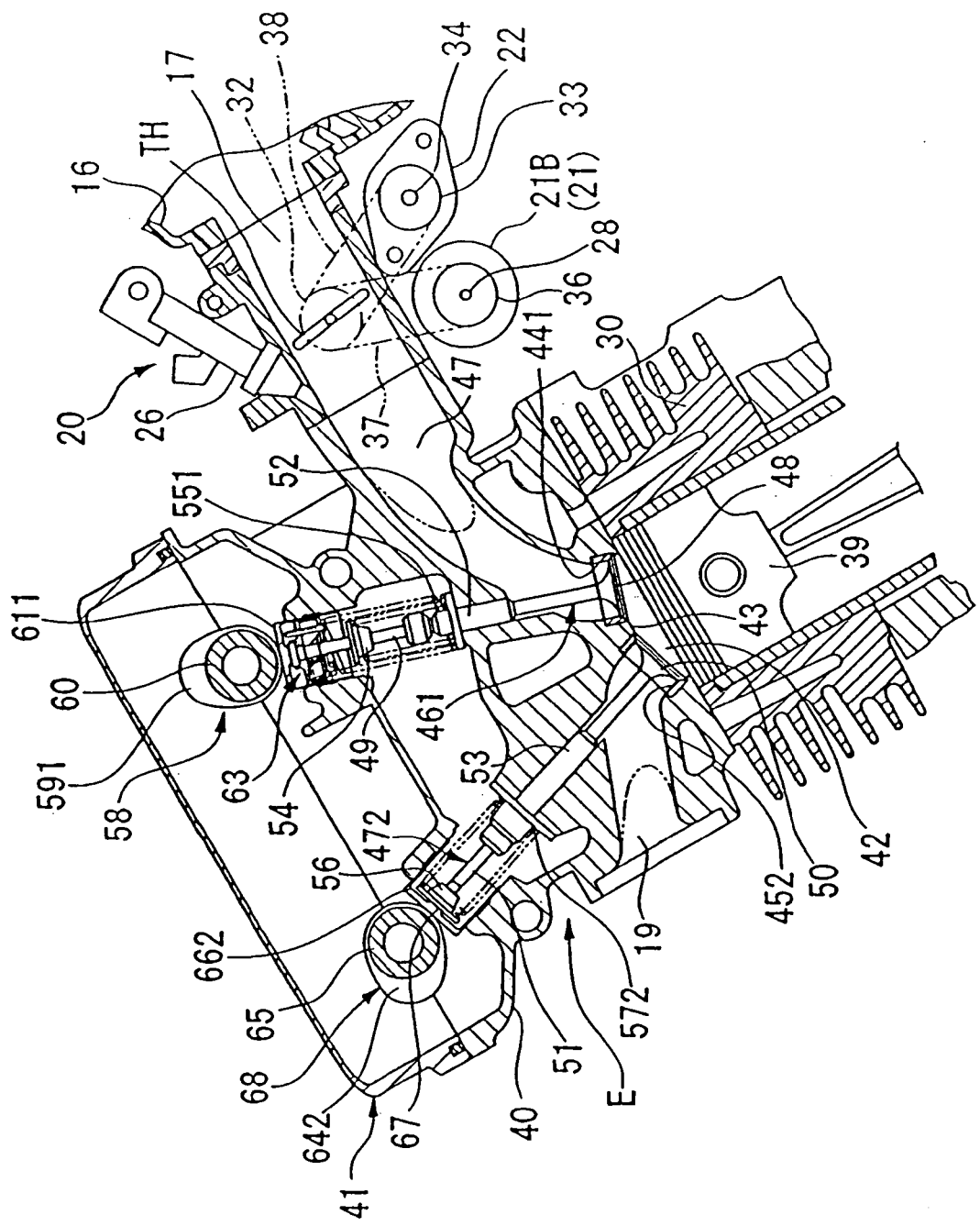
FIG. 3 is a sectional view of the engine along line 3—3 of FIG. 1 showing the number four cylinder of the engine in which a second exhaust valve is formed conventionally, and a first intake valve includes a valve stop mechanism.

A selected illustrative embodiment of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art. As shown in FIGS. 1 to 3, an engine E, according to the selected illustrative embodiment hereof, is a water-cooled, 4-cylinder motorcycle engine, for example. In the engine E, a cylinder head 40 is fixed on the top face of a cylinder block 30, and a head cover 41 is mounted to the top face of the cylinder head 40.

A cam chain case C is formed at a side portion of the engine E. A number one (#1) cylinder, a number two (#2) cylinder, a number three (#3) cylinder and a number four (#4) cylinder are arranged along the vehicle width direction, starting from the side of the engine opposite the cam chain case C. Each of these cylinders is provided with four valves, including two intake valves and two exhaust valves, which will be described later.

As shown in FIGS. 2 and 3, a throttle body 20 is connected to the cylinder head 40 so as to be oriented substantially horizontally. An intake air duct 16 is connected to the throttle body 20 on the upstream side thereof. During engine operation, intake air passes through an intake passage 17 formed in the throttle body, and is subsequently introduced to each cylinder via an intake port 18 formed in the cylinder head 40.

A butterfly-type throttle valve TH is provided in the intake passage 17 of the throttle body 20. The throttle valve TH is adjustably movable through a range extending between a fully opened position and a fully closed position. The throttle valve TH is operated by a so-called drive-by-wire or electronic throttle control system, in which the throttle valve TH is opened and closed in conjunction with a motor 21 according to an angular handgrip opening (throttle operation variable) $\theta g$, i.e., the amount of operation of the throttle handgrip by the driver, indicating the driver's intention toward acceleration or the like. In addition, a throttle valve position sensor (throttle valve control mechanism) 22 for detecting the throttle valve opening is connected to the throttle valve TH, so that the accurate turn angle of the throttle valve TH turned by the motor 21 can be detected.

Figure 4:
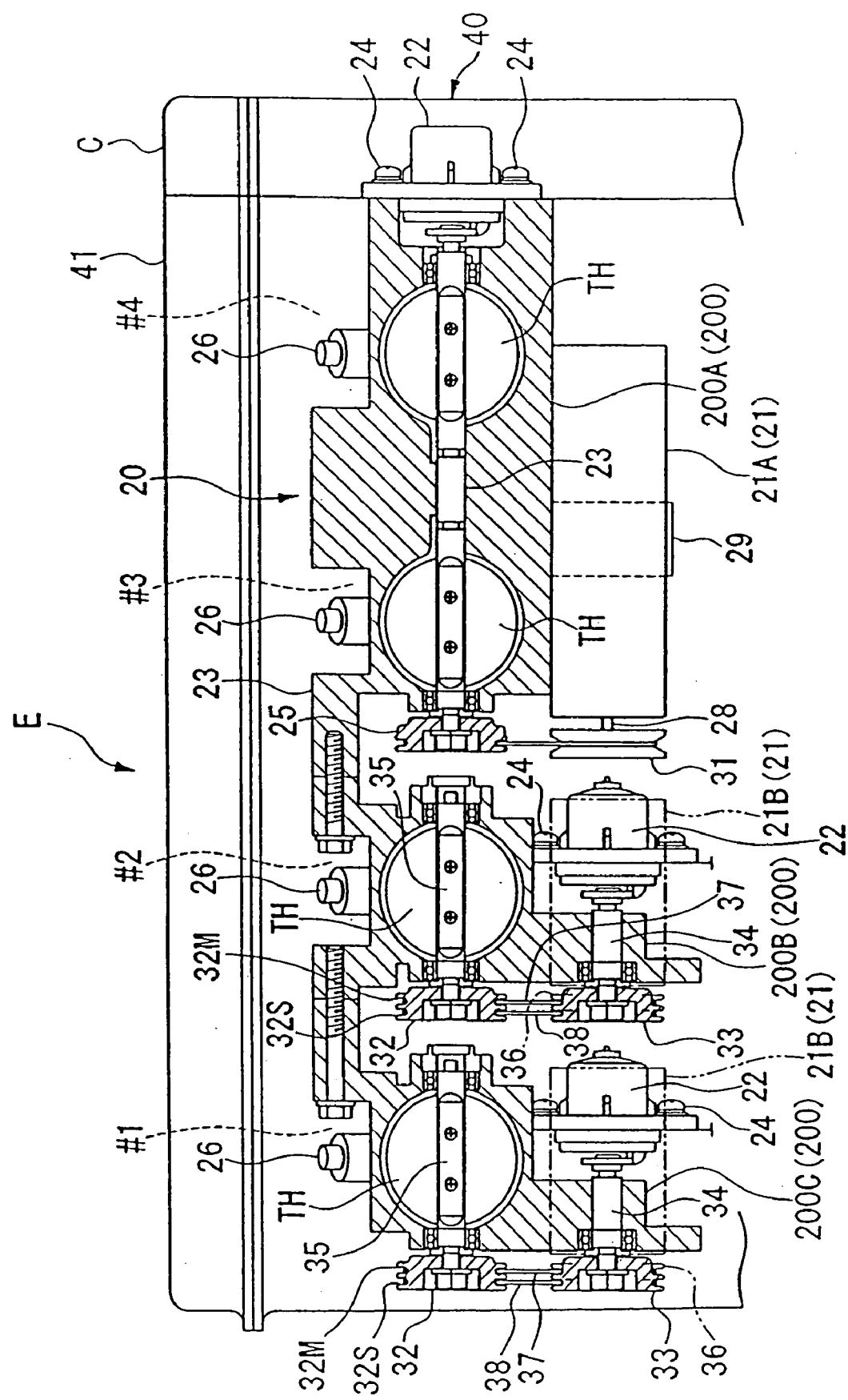
FIG. 4 is a sectional view of the engine along line 4—4 of FIG. 1 showing the throttle body configuration in which the number three and four cylinders form a cylinder group and share a throttle valve control mechanism, the number two cylinder forms a cylinder group and has a throttle valve control mechanism, and the number one cylinder forms a cylinder group and has a throttle valve control mechanism.

As shown in FIG. 4, in the throttle body 20, a throttle body block (throttle valve control mechanism) 200 is provided with four throttle valves TH, TH, TH, TH, wherein a throttle valve TH is provided for each cylinder. The throttle body block 200 is composed by interconnecting a third-fourth throttle body block (throttle valve control mechanism) 200A corresponding to the #4 cylinder and the #3 cylinder, a second throttle body block (throttle valve control mechanism) 200B corresponding to the #2 cylinder, and a first throttle body block (throttle valve control mechanism) 200C corresponding to the #1 cylinder.

Therefore, the #3 cylinder and the #4 cylinder, corresponding to the third-fourth throttle body block 200A, constitute a first cylinder group, the #2 cylinder corresponding to the second throttle body block 200B constitutes a second cylinder group, though it is a single cylinder, and the #1 cylinder corresponding to the first throttle body block 200C constitutes a third cylinder group, though it is a single cylinder. Thus, the engine E according to the illustrative embodiment includes three cylinder groups.

A third-fourth shaft 23 is a throttle valve shaft joining the respective throttle valves TH of the #3 cylinder and the #4 cylinder, for simultaneous concurrent operation of these throttle valves. At an end portion of the third-fourth shaft 23 on the side of the cam chain case C, the throttle valve position sensor 22 is coaxially mounted to the third-fourth throttle body block 200A by small screws 24. In addition, a pulley 25 is mounted to an end portion of the third-fourth shaft 23, on the side thereof opposite to the cam chain case C. On the other hand, an injector 26, for injecting fuel into each intake passage (see FIG. 2), is inserted and fixed to an upper portion, or an upper wall, of the third-fourth throttle body block 200A, for each of the third and fourth throttle valves TH, and the injector is inclined with its lower end aimed toward the cylinder head 40, as shown.

The injector 26 is connected to a fuel supply line 27 (see FIG. 1). In addition, a third-fourth motor (throttle valve control mechanism) 21A is mounted, by a fastening means 29, to the third-fourth throttle body block 200A, on the side of the main body block 200A opposite the injector 26. The drive shaft 28 of the third-fourth motor is parallel to the third-fourth shaft 23. Here, a pulley 31 is mounted to an end portion of the drive shaft 28, on the side of the third-fourth motor 21A opposite to the cam chain case C.

A pulley 32 for opening and closing the throttle valve TH of the second throttle body block 200B is mounted to an end portion of a throttle shaft 35 on the side of the throttle valve TH opposite to the cam chain case C. The throttle valve position sensor 22 for sensing the throttle opening of the #2 cylinder is mounted to a lower portion of the second throttle body block 200B. A pulley 33 is mounted to an end portion of a sensor shaft 34, on the side of the throttle valve position sensor 22 opposite to the cam chain case C.

Additionally, as shown in FIG. 4, a first auxiliary motor (throttle valve control mechanism) 21B is mounted to the front side of the throttle valve position sensor 22 and on the side of the throttle body TH opposite to the injector 26, through a bracket (not shown). The drive shaft of the first auxiliary motor is parallel to the shaft 35 of the associated throttle valve TH. A pulley 36 is mounted to an end portion of the drive shaft of the first auxiliary motor 21B, on the side thereof opposite to the cam chain case C.

In addition, a pulley groove 32M of the pulley 32 and a pulley groove of the pulley 36 of the motor 21B are connected by an endless wire loop 37, while a pulley groove 32 of the pulley 32 of the shaft 35 and a pulley groove of the pulley 33 of the throttle valve position sensor 22 are connected by an endless wire loop 38.

Similarly, pulleys 32, 33, 36 are mounted to an end portion of the first throttle body block 200C corresponding to the #1 cylinder. The pulleys 32, 33, 36 are mounted on a side of the throttle body TH opposite to the cam chain case C. The throttle valve position sensor 22 and the motor 21B in a font-rear relationship are mounted to a lower portion of the first throttle body block 200C. The pulley 32 and the pulley 36 of the motor 21B are connected by an endless wire loop 37, while the pulley 32 and the pulley 33 of the throttle valve position sensor 22 are connected by an endless wire loop 38.

As shown in FIGS. 2 and 3, the cylinder head 40 is provided with a recessed portion 43 for defining a combustion chamber 42 together with the cylinder block 30 and a piston 39. The recessed portion 43 is provided with intake valve ports 441, 442 and exhaust valve ports 451, 452. The first intake valve port 441 is opened and closed by a first intake valve 461, and the second intake valve port 442 is opened and closed by a second intake valve 462. Similarly, the first exhaust valve port 451 is opened closed by a first exhaust valve 471, and the second exhaust valve port 452 is opened and closed by a second exhaust valve 472. Incidentally, in the #4 cylinder as shown in FIGS. 2 and 3, the first intake valve 461 is a rest-able (ie, configured to be controlled between a rest mode and an operating mode) intake valve, and the first exhaust valve 471 is a rest-able exhaust valve.

The first and second intake valves 461, 462 have a configuration in which the lower end of a valve stem 49 is integrally connected to a valve body portion 48, capable of closing the corresponding intake valve port 441, 442. The first and second exhaust valves 471, 472 have a configuration in which the lower end of a valve stem 51 is integrally connected to a valve body portion 50 capable of closing the corresponding exhaust valve port 451, 452.

The valve stems 49 of the first and second intake valves 461 and 462 are slidably fitted in valve guide cylinders 52 provided in the cylinder head 40. Similarly, the valve stems 51 of the first and second exhaust valves 471 and 472 are slidably fitted in valve guide cylinders 53 provided in the cylinder head 40.

A retainer 54 is fixed to a portion of the valve stem 49 of the first intake valve 461 which projects upward from the valve guide cylinder 52. The first intake valve 461 is biased, in the direction of closing the first intake valve port 441, by a coil form valve spring 551, provided between the retainer 54 and the cylinder head 40. Similarly, a retainer 54 is fixed to a portion of the valve stem 49 of the second intake valve 462 which projects upwards from the valve guide cylinder 52. The second intake valve 462 is biased, in the direction of closing the second intake valve port 442, by a coil form valve spring 552, provided between the retainer 54 and the cylinder head 40.

In the same manner as above, the first exhaust valve 471 is biased, in the direction of closing the first exhaust valve port 451, by a coil form valve spring 571, provided between a retainer 56 fixed to the valve stem 51 of the first exhaust valve 471 and the cylinder head 40. The second exhaust valve 472 is biased, in the direction of closing the second exhaust valve port 452, by a coil form valve spring 572, provided between a retainer 56 fixed to the valve stem 51 of the second exhaust valve 472 and the cylinder head 40.

The first and second intake valves 461, 462 of the combustion chambers 42 are driven by an intake-side valve operating device 58. The intake-side valve operating device 58 includes a camshaft 60 provided with first intake-side valve operating cams 591, corresponding respectively to the first intake valves 461, and second intake-side valve operating cams 592 corresponding respectively to the second intake valves 462. The intake-side valve operating device 58 also includes bottomed cylindrical valve lifters 611, slidingly driven by the first intake-side valve operating cams 591, and bottomed cylindrical valve lifters 612, slidingly driven by the second intake-side valve operating cams 592.

The camshaft 60 has an axis orthogonal to extensions of the axes of the valve stems 49 in the first and second intake valves 461, 462, and is rotatably supported between the cylinder head 40 and the head cover 41 joined to the cylinder head 40. The valve lifters 611 are slidably fitted in the cylinder head 40 in a direction coaxial with the axes of the valve stems 49 in the first intake valves 461, and the closing end outside surfaces of the valve lifters 611 are in sliding contact with the first intake-side valve operating cams 591. Similarly, the valve lifter 612 is slidably fitted in the cylinder head 40 in a direction coaxial with the axes of the valve stems 49 in the second intake valves 462, and the closing end outside surfaces of the valve lifters 612 are in sliding contact with the second intake-side valve operating cams 592.

Moreover, as shown in FIG. 2, the stem ends of the valve stems 49 in the second intake valve 462 are brought into contact with the closing end inside surface of the valve lifter 612 through a shim 62, and are normally opened and closed by the second intake-side valve operating cams 592 during the operation of the engine E.

On the other hand, as shown in FIG. 3, a valve stop mechanism 63 is provided between the valve stem 49 of the first intake valve 461 and the valve lifter 611. The valve stop mechanism effects a change between action and inaction of the pressing force from the valve lifter 611 to the first intake valve 461 in the valve-opening direction, and also brings the first intake valve 461 into the rest state, notwithstanding the sliding operation of the valve lifter 611, by bringing the pressing force into an inactive state in a specified operation range, for example, a low load range such as a low speed operation range of the engine E.

Figure 5:
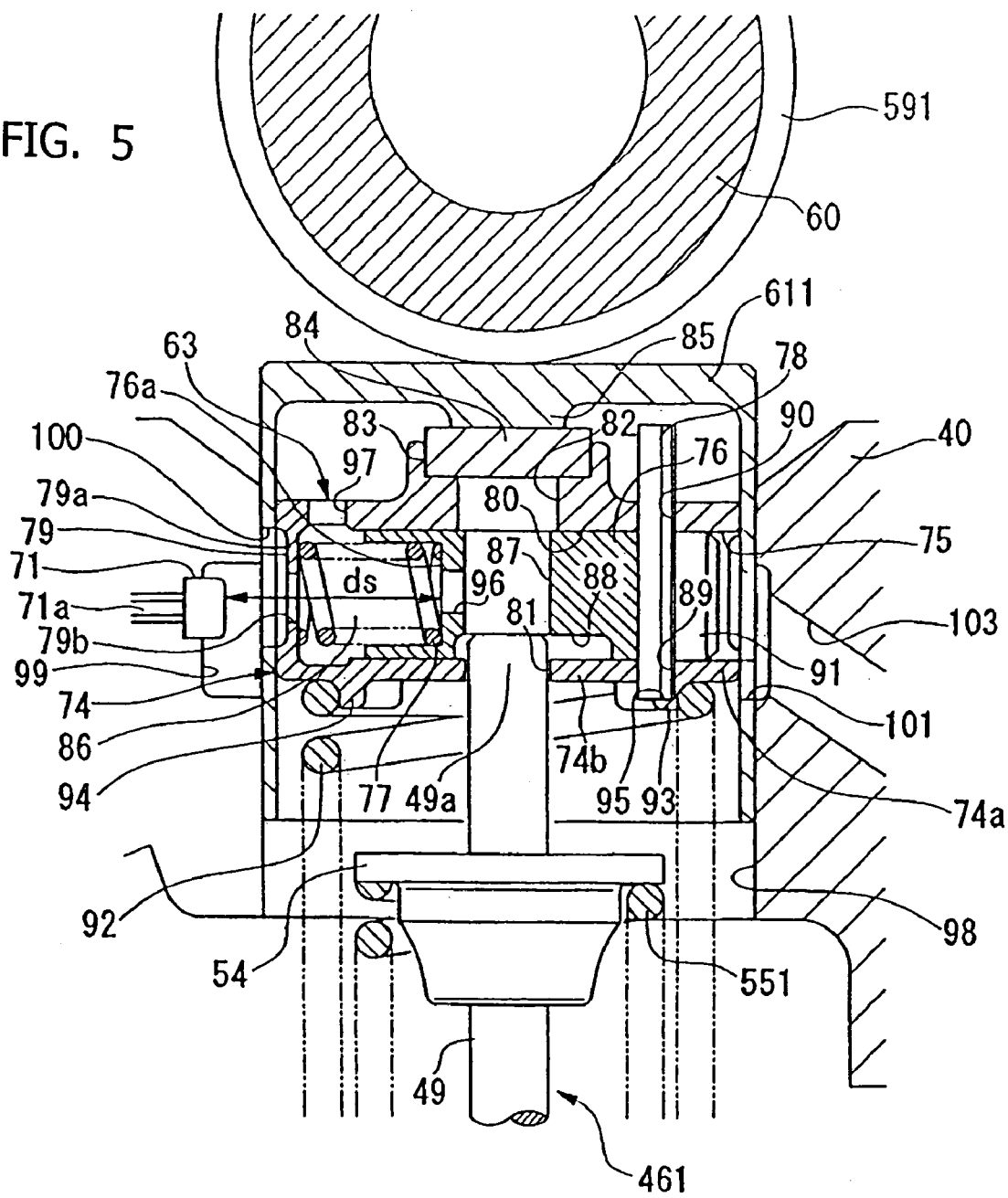
FIG. 5 is a partially enlarged detail sectional view of a portion of FIG. 3, showing the valve stop mechanism provided within the valve lifter of the first intake valve of the fourth cylinder of the engine.

As shown in FIG. 5, which shows a detail view of a part of FIG. 3, the valve stop mechanism 63 includes a substantially spool-shaped pin holder 74 which is slidably fitted in the valve lifter 611, and the pin holder has a hollow cylindrical bore formed substantially horizontally therein and defining a slide hole 80 for receiving a slide pin 76. The valve stop mechanism 63 also includes the slide pin 76, which is slidably fitted in the slide hole 80 of the pin holder 74. The slide pin 76, the pin holder 74 and the valve lifter 611 cooperate to form an oil pressure chamber 75 at an end portion of the slide hole 80, between an end of the slide pin and the inside surface of the valve lifter 611. The valve stop mechanism 63 also includes a return spring 77, which fits inside of a cylindrical spring chamber 86 formed in an open end portion of the slide pin 76, and is disposed between the slide pin 76 and the pin holder 74. The return spring 77 provides a spring force for biasing the slide pin 76 towards the right in FIG. 5, which is in a direction of reducing the volume of the oil pressure chamber 75. The valve stop mechanism 63 further includes a stopper pin 78, disposed in a substantially vertical orientation between the pin holder 74 and the slide pin 76, while inhibiting the slide pin 76 from rotating about the axis thereof. In addition, a rest discrimination sensor 71 is mounted on the side of the cylinder head 40, for detecting the position of the slide pin 76.

Figure 6:
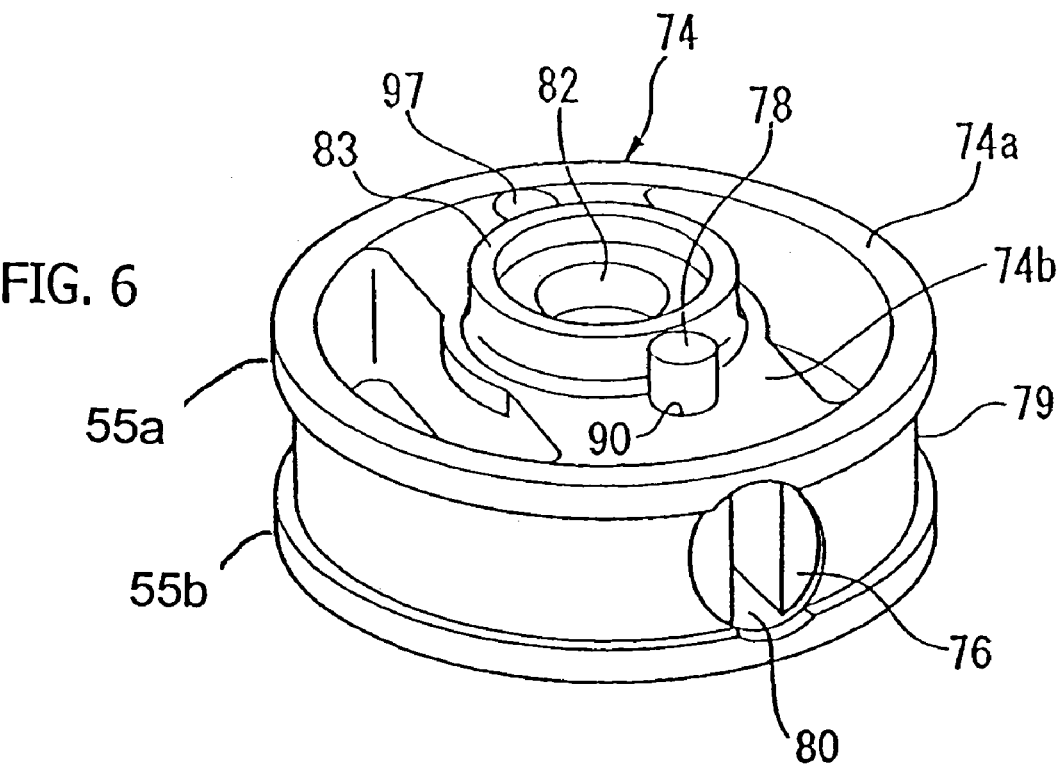
FIG. 6 is an isolated top perspective view of the pin holder of the valve stop mechanism, showing the slide pin within the slide hole formed in the bridging portion.
Figure 7:
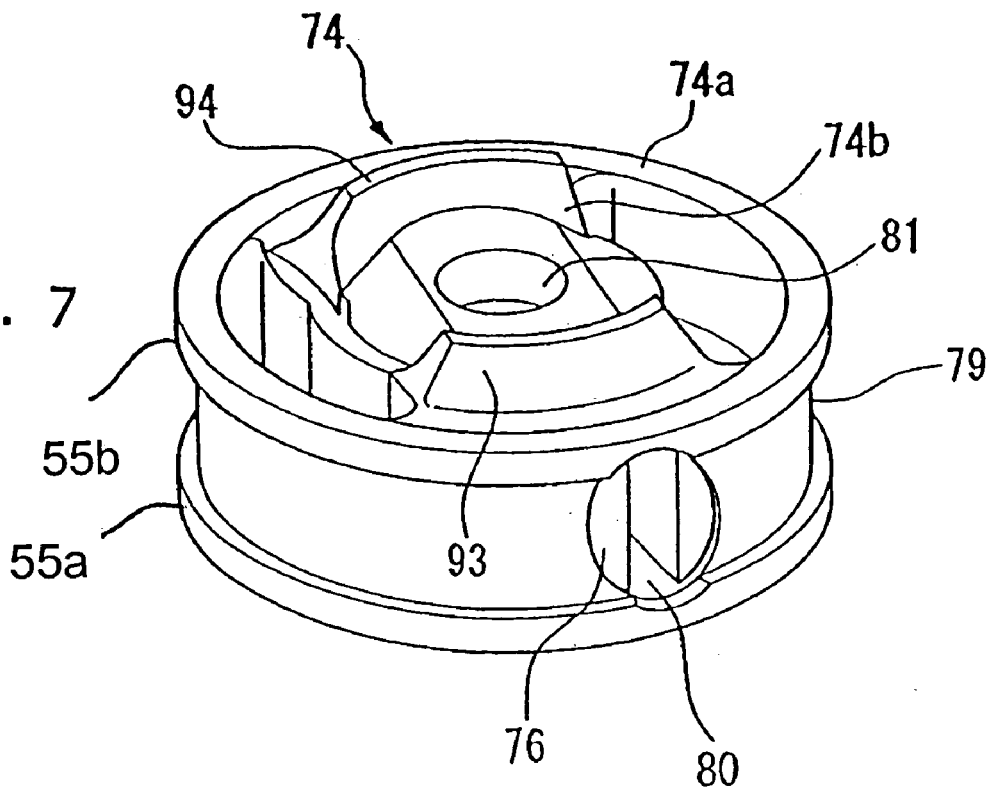
FIG. 7 is an isolated bottom perspective view of the pin holder of the valve stop mechanism, showing an axially aligned insertion hole surrounded by a pair of projections used to position an end portion of a biasing spring.

As shown in FIGS. 6 and 7, the spool-shaped pin holder 74 has a cylindrical ring portion 74a extending around an outer circumference thereof, for slidably fitting in the valve lifter 611 (see FIG. 5). The ring portion 74a is provided with outwardly extending flanges 55a, 55b extending outwardly thereon at both its top and bottom edges, as shown. An annular groove 79 is defined in the outer circumference of the ring portion 74a between the upper and lower flanges 55a, 55b of the ring portion 74a. In addition, a bridging portion 74b extends between and connects inner circumferential portions of the ring portion 74a, and is integrally formed along a diameter of the ring portion 74a (The slide hole 80 is formed inside of the bridging portion 74b). Portions of the pin holder 74 are lightened, that is partially removed, between the inner circumference of the ring portion 74a and both side surfaces of the bridging portion 74b, in order to obtain a reduction in weight. Such a pin holder 74 may be formed by lost wax casting, by forging of iron or an aluminum alloy, or may be formed from a high-strength synthetic resin. A cementation treatment is applied to the outer circumferential surface of the pin holder 74, i.e., the outer circumferential surface of the ring portion 74a, which is made of a metal, and to the inner circumferential surface of the valve lifter 611, thereby integrally affixing the pin holder 74 to the interior surface of the valve lifter 611.

The bridging portion 74b is provided with the slide hole 80 formed therein, as noted, and the slide hole 80 has an axis extending in the longitudinal direction of the bridging portion 74b, i.e., in a direction orthogonal to the axis of the valve lifter 611. The slide hole 80 has a dead-headed or bottomed shape, with one end being opened to the annular groove 79, and the other end being closed. In addition, the bridging portion 74b is provided with an insertion hole 81 formed in a central lower portion thereof (FIG. 7), which communicates with the slide hole 80. The bridging portion 74b is also provided with an extension hole 82 formed in a central upper portion thereof (FIG. 6), which also communicates with the slide hole 80, and which is coaxial with the insertion hole 81. The bridging portion 74b is integrally provided with a hollow cylindrical seat 83 formed therein at an upper central portion thereof in the periphery of the extension hole 82, extending coaxially with the axis of the extension hole 82. Further, the bridging portion 74b is provided with a upper pin mount hole 90 which communicates with the slide hole 80. The upper pin mount hole 90 is formed in an upper section of the bridging portion 74b at one side of the seat 83, and positioned in the region extending from a portion corresponding to the one end (open end) of the slide hole 80 to the extension hole 82. Similarly, as shown in FIG. 5, the bridging portion 74b is provided in its lower portion with a lower pin mount hole 89 which communicates with the slide hole 80, positioned in a region of the bridge portion extending from a portion corresponding to the one end (open end) of the slide hole 80 to the insertion hole 81. The lower pin mount hole 89 is aligned with and formed coaxially with the upper pin mount hole 90, and the stopper pin 78 is mounted therein.

A solid, disk-like shim 84 (FIG. 5) is fitted in the seat 83 of the pin holder 74, and an end portion of the extension hole 82 is thereby closed. A central dependent boss 85 of the valve lifter 611, provided at a central portion of the inside surface of the closed end of the valve lifter 611, rests on and abuts on the shim 84. A stem end 49a of the valve stem 49 of the first intake valve 461 is inserted in the insertion hole 81 in the lower portion of the pin holder 74. In addition, the slide pin 76 is slidably fitted in the slide hole 80. The oil pressure chamber 75 communicates with the annular groove 79, and is formed between one end of the slide pin 76 and the inside surface of the valve lifter 611. The return spring 77 is contained in a spring chamber 86 formed between the other end of the slide pin 76 and the closed end of the slide hole 80. In cases where the pin holder 74 is made of a synthetic resin, its portion for sliding contact with the slide pin 76 may be provided as a metal insert, which fits into the body of the synthetic pin holder.

Figure 8:
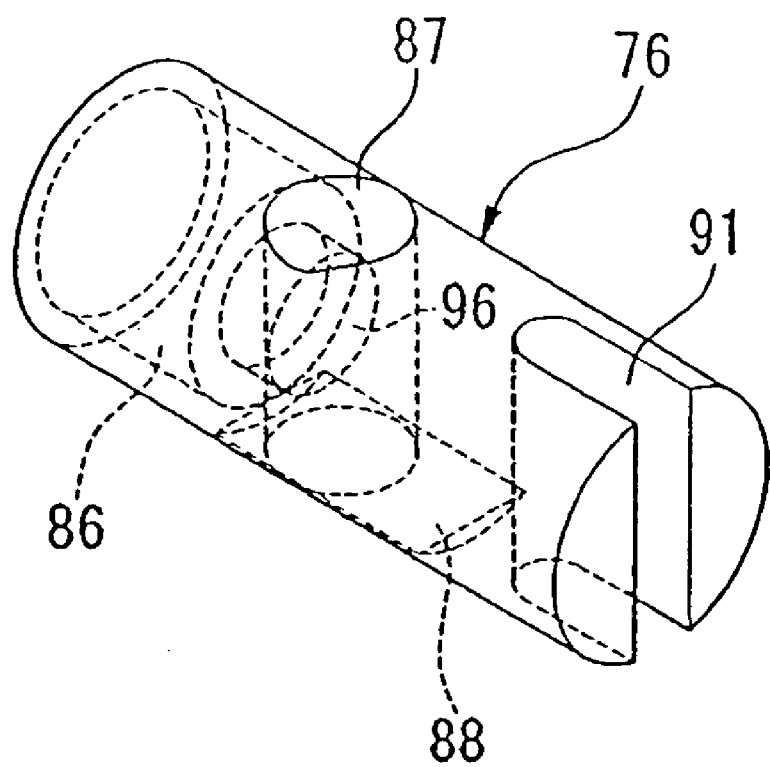
FIG. 8 is a perspective view of a slide pin, showing a slit formed in one end, a flat abutment surface formed along a bottom surface thereof, and a containing hole extending transversely through the pin and opening at one side of the abutment surface.

As shown in FIGS. 5 and 8, the slide pin 76 is provided with a containing hole 87 formed through in an intermediate portion of the slide pin, in the axial direction thereof. The containing hole 87 coaxially communicates with the insertion hole 81 and the extension hole 82, and has such a diameter that the stem end 49a of the valve stem 49 can be contained therein. Further, an end portion of the containing hole 87, on the side of the insertion hole 81, is opened to a flat abutment surface 88 formed on the outside surface of a lower portion of the slide pin 76, oppositely to the insertion hole 81. Here, the abutment surface 88 is formed to be comparatively long along the axial direction of the slide pin 76, and the containing hole 87 is opened to a portion of the abutment surface 88, on the side of the spring chamber 86. In addition, as seen best in FIG. 8, a slit 91 is provided on one end side of the slide pin 76, opened toward the side of the oil pressure chamber 75. A magnetism-generating member, such as a magnet, is embedded in the slide pin 76 so as to enhance the detection accuracy of a rest discriminating magnetic sensor 71, which will be described later.

Additionally, the slide pin 76 is provided with an axial communication hole 96, extending axially therein between the spring chamber 86 and the containing hole 87, for permitting fluid communication therebetween. The axial communication hole 96 prevents variations from occurring in the pressure inside the spring chamber 86, when the slide pin 76 is moved in the axial direction. Further, as shown in FIGS. 5 and 6, the pin holder 74 is provided with an upper communication hole 97, on the opposite side of the bridge from the upper mounting hole 90, for permitting communication between the spring chamber 86 and the space inside of the valve lifter 611 above the pin holder 74. The upper communication hole 97 prevents the pressure in the space from varying with temperature. In addition, a wall portion 79a of the annular groove 79 forming the spring chamber 86 is provided with an opening 79b. The diameter of the opening 79b is set smaller than the diameter of the return spring 77.

Further, a coil spring 92 is provided between the pin holder 74 and the cylinder head 40, for biasing the pin holder 74 in the direction of abutting the shim 84 mounted to the pin holder 74 against the central dependent boss 85 of the valve lifter 611. The coil spring 92 is mounted so as to surround the valve stem 49 at such a position as to obviate the contact of its outer circumference with the inside surface of the valve lifter 611. The lower surface of the bridging portion 74b of the pin holder 74 is integrally provided with a pair of projections 93, 94 (FIGS. 5, 7) for positioning an end portion of the coil spring 92 in a direction orthogonal to the axis of the valve stem 49.

Both the projections 93, 94 are projectingly provided integrally on the pin holder 74 with a projection amount not more than the wire diameter of the coil spring 92, and are formed in a circular arc shape, with the axis of the valve stem 49 as a center of the circle. In addition, one projection 93 is provided with a step portion 95. Step portion 95 abuts an end portion of the stopper pin 78, on the side of the first intake valve 461, to limit downward travel of the stopper pin, and to thereby inhibit the stopper pin 78 from moving toward the side of the first intake valve 461.

As illustrated in FIG. 5, the cylinder head 40 is provided with a support hole 98 for fitting the valve lifter 611 therein so as to slidably support the valve lifter 611. The support hole 98 is provided in its inside surface with an annular recessed portion 99 for surrounding the valve lifter 611. The annular recessed portion 99 is connected to a working oil pressure supply passage 103 formed in the cylinder head 40, and is supplied with a working oil. Additionally, the valve lifter 611 is provided with a release hole 101 and a lateral communication hole 100 for communicating the annular recessed portion 99 with the annular groove 79 in the pin holder 74.

The lateral communication hole 100 is provided at such a position as to permit fluid communication between the annular recessed portion 99 of the cylinder head support hole 98 and the annular groove 79 of the pin holder 74, notwithstanding the sliding of the valve lifter 611 in the support hole 98. The release hole 101 is provided in the valve lifter 611 at such a position that the annular recessed portion 99 communicates with the inside of the valve lifter 611 on the lower side of the pin holder 74, when the valve lifter 611 is moved to an uppermost position as shown in FIG. 5, and that the communication with the annular recessed portion 99 is interrupted as the valve lifter 611 is moved downwards from the uppermost position as shown in FIG. 5, and the working oil is jetted through the release hole 101 into the inside of the valve lifter 611 as a lubricating oil.

The working oil supplied from the working oil pressure supply passage 103 into the annular groove 79 of the pin holder 74 through the lateral communication hole 100 and the release hole 101 is supplied into the oil pressure chamber 75 of the slide pin, via one end of the slide hole 80. The slide pin 76 is slid in the axial direction in such a manner that an oil pressure force, acting on one end side of the slide pin 76 due to the oil pressure inside the oil pressure chamber 75, and a spring force acting on the other end side of the slide pin 76 due to the return spring 77 balance each other. At a non-operation time (valve rest time), when the oil pressure in the oil pressure chamber 75 is low, the slide pin 76 is oriented as shown in FIG. 5, and the stem end 49a of the valve stem 49 is aligned with the containing hole 87 and the extension hole 82, and is inserted in the insertion hole 81. In contrast, in a working condition, where the oil pressure in the oil pressure chamber 75 is high, the slide pin 76 is moved to the left side in FIG. 5, so as to stagger the containing hole 87 from the axes of the insertion hole 81 and the extension hole 82, and to abut the stem end 49a of the valve stem 49 on the abutment surface 88 of the slide pin 76.

Here, the rotation of the slide pin 76 about its axis is inhibited by the stopper pin 78. The stopper pin 78 pierces through the slit 91 of the slide pin 76. Specifically, the stopper pin 78 is mounted to the pin holder 74 by piercing through the slide pin 76 while permitting the slide pin 76 to move in the axial direction, so that the abutment of the stopper pin 78 on an inner end closed portion of the slit 91 restricts the end of movement of the slide pin 76 to the side of the oil pressure chamber 75.

Further, the rest discriminating magnetic sensor 71 is mounted to the annular recessed portion 99 of the cylinder head 40 while fronting on the communication hole in the valve lifter 611 and on the opening 79b in the pin holder 76. The rest discriminating magnetic sensor 71 is a sensor which detects the distance ds from the rest discriminating magnetic sensor 71 through the communication hole 100 and the opening 79b to a wall portion 76a of the slide pin 76. The sensor 71 includes a magnet and a coil, and detects the distance ds by detecting a magnetic flux variation generated when the slide pin 76, made of a metal, is moved. A cable 71a for outputting the detection results is connected to the rest discriminating magnetic sensor 71. The cable 71a is passed through an insertion hole formed in the cylinder head 40, and is connected to an ECU (cylinder number control unit) 70 (see FIG. 9) which will be described later. Incidentally, such a rest discriminating sensor is not limited to the magnetic sensor; there may be used a sensor for detecting the distance ds by use of light, a sensor for detecting the distance ds by detecting a variation in electrostatic capacity, a sensor for detecting the distance ds by use of ultrasound, and the like.

As shown in FIGS. 2 and 3, the first and second exhaust valves 471, 472 of the combustion chambers 42 are driven by an exhaust-side valve operating device 68. The exhaust-side valve operating device 68 has a camshaft 65 provided with a first exhaust-side valve operating cams 641 corresponding respectively to the first exhaust valves 471 and with second exhaust-side valve operating cams 642 corresponding respectively to the second exhaust valves 472. The exhaust side view of the device has bottomed hollow cylindrical valve lifters 661 slidingly driven by the first exhaust-side valve operating cams 641 and bottomed hollow cylindrical valve lifters 662 slidingly driven by the second exhaust-side valve operating cams 642.

The camshaft 65 has an axis orthogonal to the extensions of the axes of the valve stems 51 of the first and second exhaust valves 471, 472, and is rotatably supported between the cylinder head 40 and the head cover 41 joined to the cylinder head 40, like the camshaft 60 of the intake-side valve operating device 58. The valve lifters 661 are slidably fitted in the cylinder head 40 coaxially with the axes of the valve stems 51 of the first exhaust valves 471, and the outside surfaces of the closed ends of the valve lifters 661 are in sliding contact with the first exhaust-side valve operating cams 641.

In addition, the valve lifters 662 are slidably fitted in the cylinder head 40 coaxially with the axes of the valve stems 51 of the second exhaust valves 472, and the outside surfaces of the closed ends of the valve lifters 662 are in sliding contact with the second exhaust-side valve operating cams 642.

The stem end of the valve stem 51 of the second exhaust valve 472 abuts on the inside surface of the closed end of the valve lifter 662 through the shim 67, and are normally opened and closed by the second exhaust-side valve operating cam 642 during the operation of the engine E. In addition, a valve stop mechanism 69 effects a change between action and inaction of the pressing force exerted from the valve lifter 661 on the first exhaust valve 471 in the valve-opening direction, and brings the first exhaust valve 471 into a resting state irrespective of the sliding of the valve lifter 661 by putting the pressing force into an inactive state in a specified operation range of the engine E, for example, in a low load range such as a low speed operation range. The valve stop mechanism 69 is provided between the stem ends 51a of the valve stem 51 of the first exhaust valve 471 and the valve lifter 661. The valve stop mechanism 69 of the exhaust-side valve operating device 68 is configured in the same manner as the valve stop mechanism 63 (see FIG. 5) in the intake-side valve operating device 58.

In the #3 cylinder, the valve stop mechanism 63 and the valve stop mechanism 69, configured in the same manner as in the #4 cylinder, are provided for the second exhaust valve 472 (corresponding to a second exhaust valve port 452) and the second intake valve 462 (corresponding to a second intake valve port 442), while the first exhaust valve 471 and the first intake valve 461 are not provided with respective valve stop mechanisms 63, 69, in a manner contrary to that in the #4 cylinder. Further, in the #1 cylinder and the #2 cylinder, the valve stop mechanism 63 and the valve stop mechanism 69 are provided for all the intake valves 461, 462 and the exhaust valves 471, 472.

Therefore, since in the #1 cylinder and the #2 cylinder the valve stop mechanisms 63, 69 are provided for all the engine valves, these valve stop mechanisms 63, 69 function as a cylinder resting mechanism, and a cylinder rest where all the engine valves are in rest (the cylinders are rest-able cylinders) can be performed. Additionally, in the #3 cylinder and the #4 cylinder, a valve rest where one engine valve each on the intake side and the exhaust side is in rest (the cylinders are normally operative cylinders) can be performed.

As shown in FIG. 1, a side wall on the #4 cylinder side of the cylinder head 40 is provided with a cam chain case C, and a cam chain (not shown) for driving the camshafts 60, 65 of the intake-side and exhaust-side valve operating devices 58, 68 are contained in the cam chain case C. A side wall of the cylinder head 40 on the opposite side of the cam chain case C is provided with connection ports PA, PB, PC of oil pressure control valves 113A, 113B, 113C for controlling the supply of the working oil to the valve stop mechanisms 63, 69 (see FIGS. 2 and 3) of the intake-side and exhaust-side valve operating devices 58, 68.

The connection port PA is connected to a working oil supply passage 103A which extends in the cylinder head 40 between a central portion in the front-rear direction of the cylinder head 40 to each intake valve port along the longitudinal direction to the layout position of the second intake valve port 442 of the #2 cylinder and which is branched toward the second intake valve port 442 of the #2 cylinder and the second exhaust valve port 452 of the #2 cylinder.

The connection port PB is connected to a working oil supply passage 103B which extends in the cylinder head 40 between a central portion in the front-rear direction of the cylinder head 40 to each exhaust valve port along the longitudinal direction to the layout position of the first exhaust valve port 451 of the #1 cylinder and which is branched toward the first exhaust valve port 451 of the #1 cylinder and the first intake valve port 441 of the #1 cylinder.

The connection port PC is connected to a working oil supply passage 103C which extends in the other side wall of the cylinder head 40 along the longitudinal direction to the layout position of the first exhaust valve port 451 of the #4 cylinder and which is branched toward the first exhaust valve port 451 of the #4 cylinder, the second exhaust valve port 452 of the #3 cylinder, the first exhaust valve port 451 of the #2 cylinder and the second exhaust valve port 452 of the #1 cylinder.

In addition, in correspondence with the working oil supply passage 103C, a working oil supply passage 103C' is formed in the rear side wall of the cylinder head 40 along the longitudinal direction of the cylinder head 40 to the layout position of the first intake valve port 441 of the #4 cylinder, and the working oil supply passage 103C and the working oil supply passage 103C' are connected to each other through a crossing passage 103X. Additionally, the working oil supply passage 103C' is branched to be connected to the first intake valve port 441 of the #4 cylinder, the second intake valve port 442 of the #3 cylinder, the first intake valve port 441 of the #2 cylinder and the second intake valve port 442 of the #1 cylinder.

Therefore, in the #1 cylinder and the #2 cylinder, among the #1 cylinder, the #2 cylinder and the #3 cylinder, i.e., the cylinders located on the opposite side of the cam chain case C, all the engine valves consisting of the first intake valve 461, the second intake valve 462, the first exhaust valve 471 and the second exhaust valve 472 are configured to be rest-able.

When solenoids (not shown) are turned ON, the oil pressure control valves 113A, 113B, 113C are so operated that a working oil pressure is exerted on the connection ports PA, PB, PC via an in-port IN; when the solenoids are turned OFF, the exerted oil pressure is led to a drain port D, and the oil pressure control valves 113A, 113B, 113C are so operated that the working oil is supplied to the valve stop mechanisms 63, 69 through the working oil supply passage 103A, the working oil supply passage 103B, and the working oil supply passage 103C (103C'). Incidentally, in FIG. 1, symbol IN denotes an in-port, OUT denotes an out-port, and D denotes a drain port.

Figure 9:
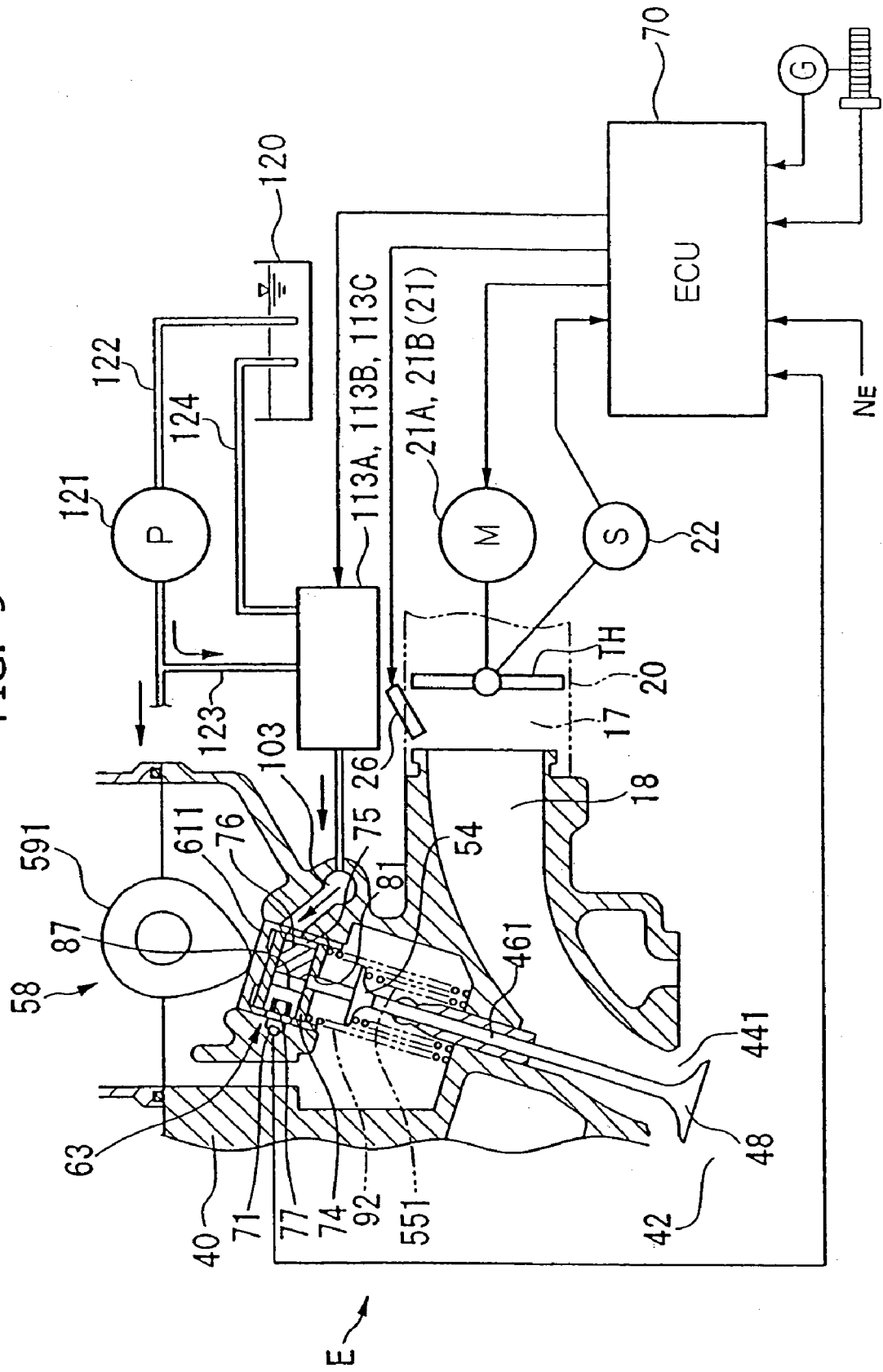
FIG. 9 is a system diagram showing a valve operating condition.

As shown in FIG. 9, the oil pressure control valves 113A, 113B, 113C are supplied with the working oil which is reserved in an oil pan 120. A main oil pressure passage 122 fitted with a pump 121 is connected to the oil pan 120, and, on the discharge side of the pump 121, a branch passage 123 connected to the oil pressure control valves 113A, 113B, 113C is branched from the main oil pressure passage 122. In addition, the drain ports D (see FIG. 1) of the oil pressure control valves 113A, 113B, 113C are connected to a drain passage 124 so that the working oil can be recovered into the oil pan 120.

The control of the oil pressure control valves 113A, 113B, 113C is conducted by the ECU 70, which is an electronic control unit, based on the handgrip opening θg detected by a handgrip opening sensor G, the engine speed Ne, the rest discriminating magnetic sensor 71 and the like. In addition, the ECU 70 controls the throttle valve TH by outputting a turning command signal to each of the motors 21A, 21B while detecting the throttle valve opening by a throttle valve position sensor 22 so as to set optimum the throttle valve opening based on the value detected by the handgrip opening sensor G and the like. Further, fuel injection amount at the injector 26 is regulated based on a control signal from the ECU 70. Thus, the ECU 70 has means for changing over the oil pressure control valves 113A, 113B, 113C, means for controlling the throttle valve opening, and a means for controlling the fuel injection amount.

Next, the valve rest and the cylinder rest conducted under the control by the ECU 70 will be described, the description being centered on the operations of the intake valves 461, 462 and the exhaust valves 471, 472 provided with the valve stop mechanisms 63, 69.

As shown in FIG. 9, when the valve rest and the cylinder rest are not conducted, the ECU 70 drives the throttle valve TH by outputting the turning command signal to each of the motors 21A, 21B while detecting the throttle valve opening by the throttle valve position sensor 22, based on the detection signals fed from the handgrip opening sensor G and the like. In addition, the fuel injection amount at the injector 26 is regulated based on the control signal from the ECU 70.

The oil pressure chamber 75 of the valve stop mechanism 63 is supplied with the working oil via the working oil supply passage 103, whereby the return spring 77 is compressed, and the slide pin 76 is located on a comparatively left side in FIG. 9. Additionally, the valve stop mechanism 69 on the exhaust side as shown in FIG. 2 is also configured so that the oil pressure of the working oil acts on the slide pin 76.

Therefore, when the valve lifter 611 is slid by the pressing force exerted from the intake-side valve operating device 58, the pin holder 74 and the slide pin 76 are accordingly moved to the side of the first intake valve 461, and, attendant on this, a pressing force in the valve opening direction is exerted on the first intake valve 461, whereby an air-fuel mixture is taken through the first intake valve port 441 into the combustion chamber 42 (intake stroke). The mixture gas in the combustion chamber 42 is compressed by the piston 38 (see FIG. 2) and is then ignited by a spark plug (not shown) into combustion.

In addition, as shown in FIG. 2, when the valve lifter 661 is slid by a pressing force exerted from the exhaust-side valve operating device 68, the pin holder 74 and the slide pin 76 are accordingly moved to the side of the exhaust valve 471, and, attendant on this, a pressing force in the valve opening direction is exerted on the exhaust valve 471, whereby an exhaust gas is exhaust through the first exhaust valve port 451 to the exhaust port 19 (exhaust stroke).

Figure 10:
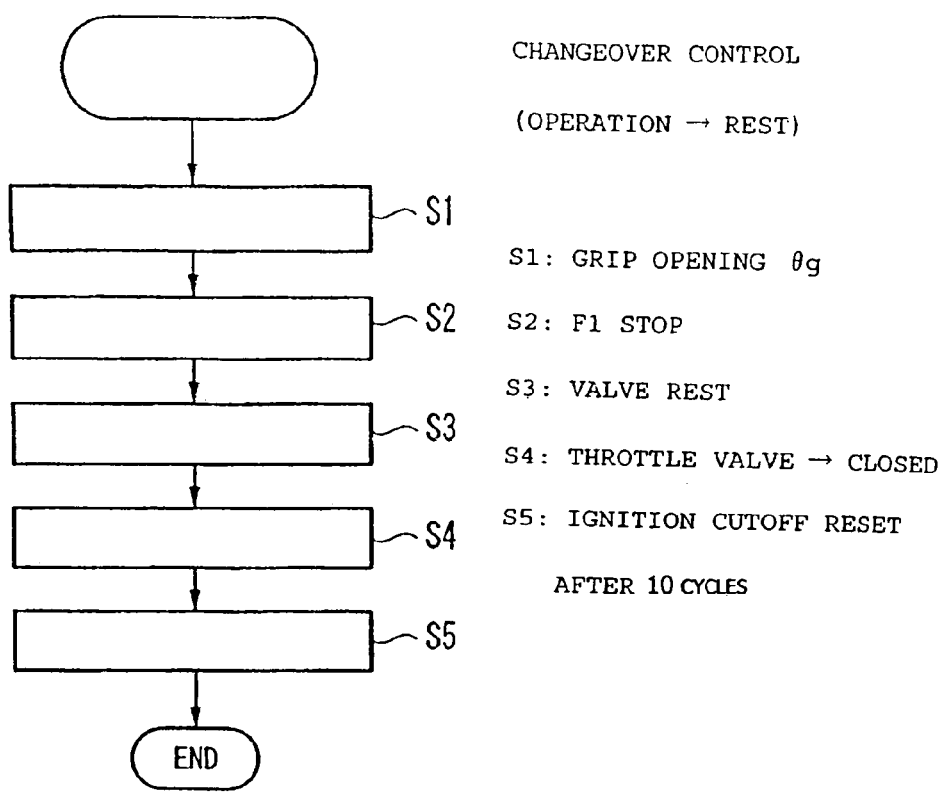
FIG. 10 is a flow chart showing the process of transitioning from valve operation to valve rest.

The processing by the ECU 70 in the case where predetermined conditions are fulfilled and the valve rest and cylinder rest are conducted will be described based on a flow chart shown in FIG. 10. First, the ECU 70 detects the handgrip opening θg (step S1), and the passage of current to the injector 26 is stopped, thereby stopping the fuel supply (F1) (step S2). Thereafter, the exhaust valves 471, 472 and the intake valves 461, 462 are rested (step S3).

The resting of the exhaust valves 471, 472 and the intake valves 461, 462 is carried out as follows.

After the completion of the exhaust stroke is confirmed by a crank angle sensor (not shown) or the like, a control signal is outputted to each of the oil pressure control valves 113A, 113B, 113C, to discharge the working oil from the oil pressure chamber 75 (see FIG. 5), and the exhaust valves 471, 472 are rested. The resting of the exhaust valves 471, 472 is confirmed by use of the rest discriminating magnetic sensor 71. When the above-mentioned distance ds detected by the rest discriminating magnetic sensor 71 has reached a distance corresponding to the position where the containing hole 87 and the insertion hole 81 are matched, the ECU 70 determines that the exhaust valves 471, 472 corresponding to the rest discriminating magnetic sensor 71 has come to a rest.

After the resting of the exhaust valves 471, 472 is confirmed, a control signal is outputted to each of the oil pressure control valves 113A, 113B, 113C, to stop the intake valves 461, 462. The resting of the intake valves 461, 462 is also conducted based on the distance ds detected by the rest discriminating magnetic sensor 71 provided in the vicinity of the stem end 49*a* of each of the intake valves 461, 462, in the same manner as above.

Then, the throttle valve TH is put into a closed state by driving the motors 21A, 21B (step S4), and the supply of electric power to the spark plug is interrupted (step S5). The cutoff of ignition is carried out for several cycles (in this embodiment, 10 cycles), and thereafter the ignition is reset. This makes it possible to confirm the cylinder rest (resting of the cylinder) with a predetermined timing, to prevent the temperature of the spark plug from being lowered at the time of re-operation, and to securely perform the cylinder re-operation with a predetermined timing.

Figure 11:
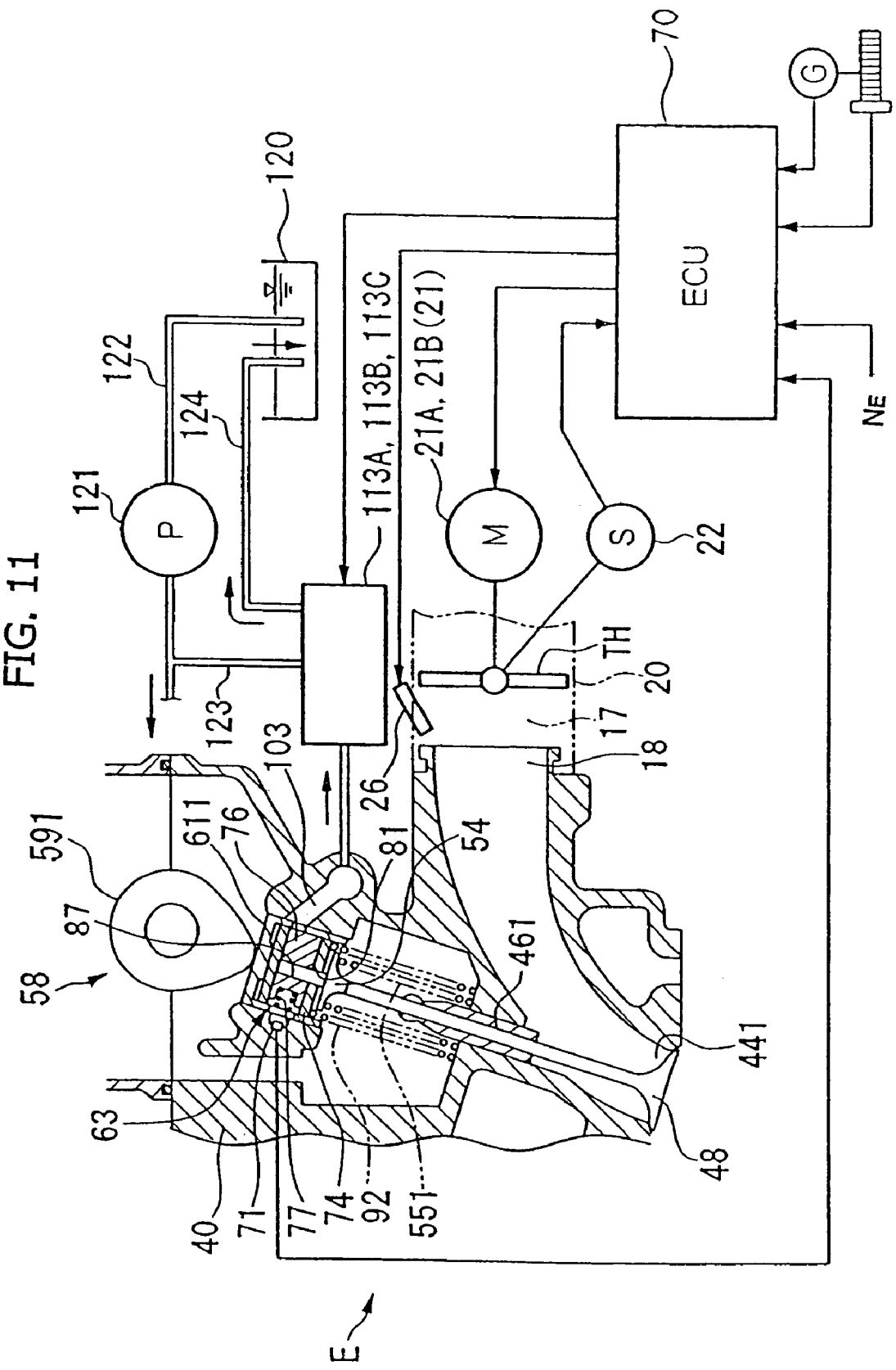
FIG. 11 is a system diagram showing a valve rest condition.

Under the above-mentioned control, the working oil is discharged via the drain passage 124 as shown in FIG. 11, the slide pin 76 is moved by the force of the return spring 77 so as to reduce the oil pressure chamber 75, and the containing hole 87 is matched to (aligned with) the insertion hole 81 in the pin holder 74. Even when the valve lifter 611 is moved toward the side of the first intake valve 461 by the intake-side valve operating device 68 in this condition, the stem end 49*a* (see FIG. 5) of the valve stem 49 is received within the insertion hole 81 and the containing hole 87, and no pressing force is exerted on the first intake valve 461, so that the first intake valve port 441 is kept closed.

In addition, the working oil is similarly discharged also from the valve stop mechanism 69 on the exhaust side as shown in FIG. 3, the containing hole 87 is matched to (aligned with) the insertion hole 81 in the pin holder 74, and no pressing force is exerted on the first exhaust valve 471, so that the first exhaust valve port 451 is kept closed.

Figure 12:
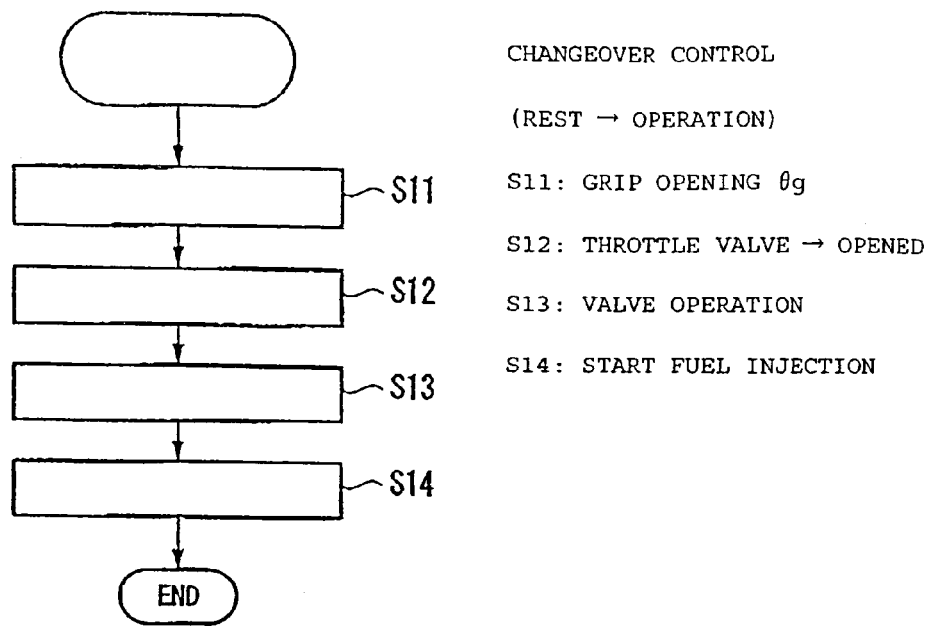
FIG. 12 is a flow chart showing the process of transitioning from valve rest to valve operation.

Next, the processing by the ECU 70 in the case of resetting a cylinder in the resting state, the intake valves 461, 462 and the exhaust valves 471, 472 will be described based on a flow chart shown in FIG. 12.

First, the ECU 70 detects the handgrip opening θg (step S11), and brings the throttle valve TH into an open state by driving the motors 21A, 21B while detecting the throttle valve opening by the throttle valve position sensor 22, based on the handgrip opening θg (step S12).

Then, the intake valves 461, 462 and the exhaust valves 471, 472 are operated (step S13). The operations of the exhaust valves 471, 472 and the intake valves 461, 462 are conducted as follows.

First, a control signal is outputted to each of the oil pressure control valves 113A, 113B, 113C, whereby an oil pressure is exerted on the slide pin 76 to move the slide pin 76, to operate the first exhaust valve 471. The operations of the exhaust valves 471, 472 are confirmed by use of the rest discriminating magnetic sensor 71. When the distance ds detected by the rest discriminating magnetic sensor 71 has come to be a distance corresponding to a position where the containing hole 87 and the insertion hole 81 are not aligned with each other, the ECU 70 determines that the exhaust valve 471, 472 corresponding to the rest discriminating magnetic sensor 71 has changed over to an operative state.

After the operations of the exhaust valves 471, 472 is confirmed, a control signal is outputted from the ECU 70 to each of the oil pressure control valves 113A, 113B, 113C (see FIG. 1), whereby the intake valves 461, 462 are operated. The operations of the intake valves 461, 462 are confirmed based on the distance ds detected by the rest discriminating magnetic sensor 71, in the same manner as above. After the operations of the intake valves 461, 462 are confirmed, the injector 16 is operated, to start the fuel supply (step S14). Incidentally, in this instance, the cutoff of ignition has been reset, so that the engine is driven by starting the fuel supply.

Figure 15:
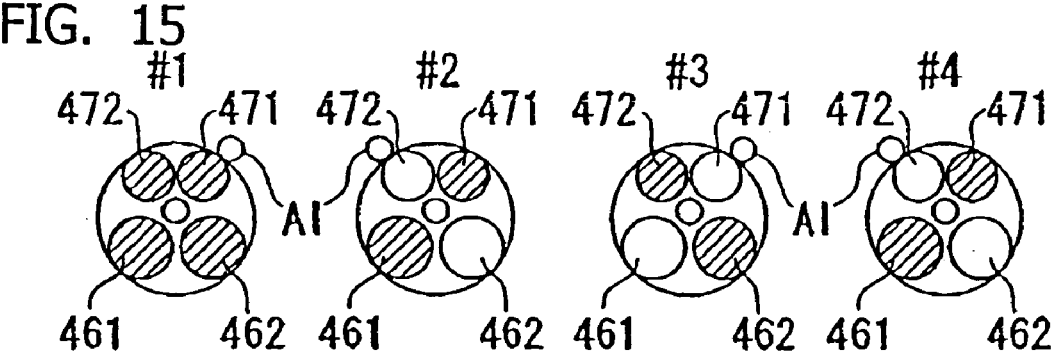
FIG. 15 is an illustration of the valve condition for the valves of each of the four cylinders where the handgrip opening is in the range of $\theta g2$ to $\theta g1$.
Figure 16:
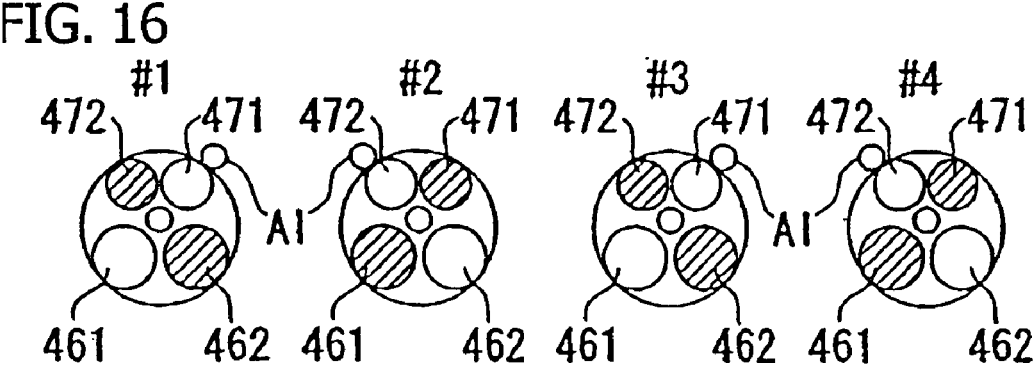
FIG. 16 is an illustration of the valve condition for the valves of each of the four cylinders where the handgrip opening is not less than $\theta g2$.

Now an explanation is provided as to how the engine valves (the exhaust valves 471, 472 and the intake valves 461, 462) are operated according to the handgrip opening θg and how the throttle valve TH is opened to increase the engine output will be described, based on FIGS. 14 to 16. Incidentally, in FIGS. 14 to 16, the hatched valves are the engine valves in the resting state. When the intake valves 461, 462 and the exhaust valves 471, 472, which are the engine valves, are all rested (all valve rest), the cylinder rest results. Here, the first intake valve 461 and the first exhaust valve 472 are disposed on a diagonal line, while the second intake valve 462 and the second exhaust valve 472 are disposed on a second diagonal line, the adjacent exhaust valves 471, 472 of the two adjacent cylinders are configured as operative valves, and a secondary air introduction valve (exhaust device) AI is provided between the exhaust valves 471, 472 (exclusive of the portion between the #2 cylinder and the #3 cylinder).

Figure 13:
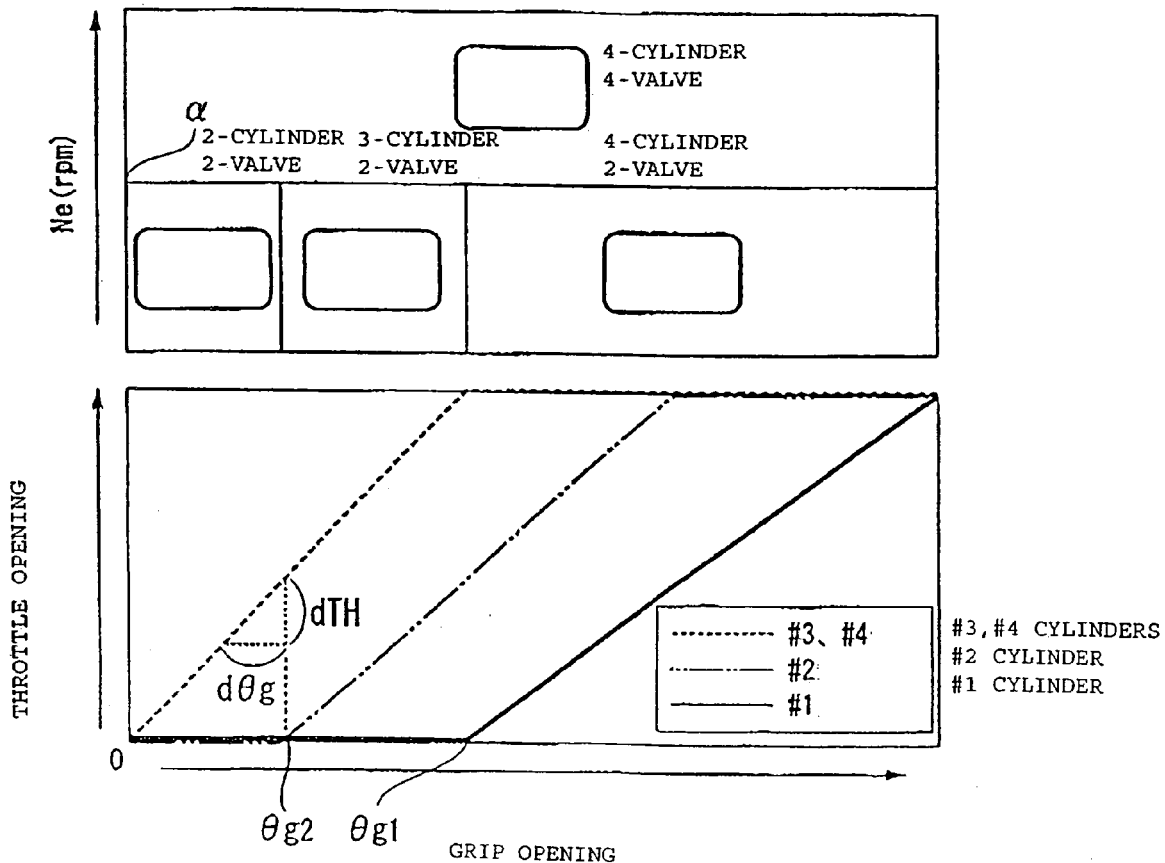
FIG. 13 is a graph diagram showing the relationships of throttle valve opening and engine speed with respect to handgrip opening.

As shown in FIG. 13, in the engine E of this embodiment, the cylinders to be operated and the throttle valve opening in each cylinder group are determined uniquely, on the basis of the handgrip opening θg best representing the driver's intention to accelerate. Specifically, the number of the cylinder groups to be operated is increased with an increase in at least the handgrip opening θg. In addition, whether the cylinder is to be rested or operated is determined based on whether the engine speed Ne is higher or lower than a threshold value α. These are controlled by the ECU 70.

First, the case where the engine speed Ne is lower than a threshold value α will be described. In this case, 2-valve operation for a low load time is established in which the individual cylinder groups, here, the cylinder group composed of the #3 cylinder and the #4 cylinder, the cylinder group composed of the #2 cylinder (in this embodiment, a single cylinder), and the cylinder group composed of the #1 cylinder (in this embodiment, a single cylinder) are each operated by use of single intake and exhaust valves.

First, in the range from an idling condition to the condition where the handgrip opening θg is an opening θg2, the cylinder rest (all valve rest) is conducted in the #1 cylinder and the #2 cylinder, the valve rest is conducted in the #3 cylinder and the #4 cylinder, and, in this condition, the throttle valve opening is gradually increased with an increase in the handgrip opening θg.

Figure 14:
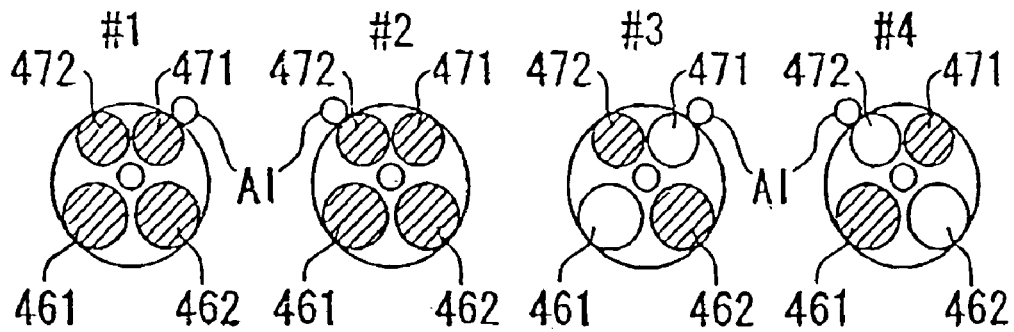
FIG. 14 is an illustration of the valve condition for the valves of each of the four cylinders where the handgrip opening is in the range of 0 to $\theta g2$.

In other words, in the condition shown in FIG. 14, the throttle valve TH for the #3 cylinder and the #4 cylinder is gradually opened (2-cylinder 2-valve operation shown in FIG. 13). Here, the average of an increase ratio (dTH/dθg) of the throttle valve opening to the handgrip opening in the #3 cylinder and the #4 cylinder is set higher than the average of the increase ratio of the throttle valve opening to the handgrip opening in the #2 cylinder.

Next, when the handgrip opening θg comes to be θg2, cylinder rest (all valve rest) is conducted in the #1 cylinder, while valve rest is conducted in the #2 cylinder, the #3 cylinder, and the #4 cylinder, and, in this condition, the throttle valve TH of the #2 cylinder is started to open, in addition to the #3 cylinder and the #4 cylinder in which the throttle valve opening thereafter increases continuously. That is, in the condition shown in FIG. 15, the throttle valve TH in the #2 cylinder, in addition to the #3 cylinder and the #4 cylinder, is gradually opened (3-cylinder 2-valve operation shown in FIG. 13). Here, the average of the increase ratio of the throttle valve opening to the handgrip opening in the #2 cylinder is set to be higher than that in the #1 cylinder in which the throttle valve is next started to open.

Then, when the handgrip opening θg2 becomes an opening θg1, valve rest is conducted in all cylinders from the #1 cylinder to the #4 cylinder, and, in this condition, the throttle valve TH of the #1 cylinder is started to open, in addition to the #3 cylinder, the #4 cylinder, and the #2 cylinder in which the throttle valve thereafter increases continuously. Namely, in the condition shown in FIG. 16, the throttle valve TH in the #1 cylinder, in addition to the #3 cylinder and the #4 cylinder, is gradually opened (4-cylinder 2-valve operation shown in FIG. 13).

Figure 17:
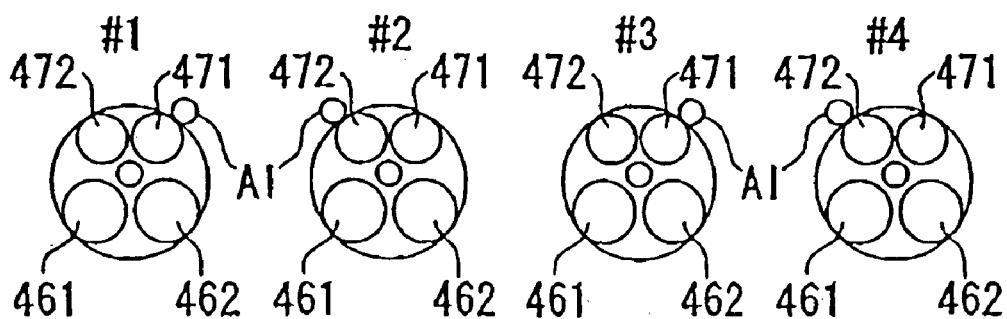
FIG. 17 is an illustration of the valve condition for the valves of each of the four cylinders in 4-valve operation.

On the other hand, when the engine speed Ne reaches or exceeds the threshold value α, 4-valve operation for a high load time is established in which each cylinder group is operated with two intake valves and two exhaust valves. First, in the condition where valve rest is not conducted in the #3 cylinder, the #4 cylinder, the #2 cylinder and the #1 cylinder, the throttle valve opening is sequentially increased according to the handgrip opening θg, and a throttle valve opening best suited to the driver's intention to accelerate is set. That is, in the condition shown in FIG. 17, the throttle valve TH is gradually opened and sequentially in the order of the #3 cylinder, the #4 cylinder, the #2 cylinder and the #1 cylinder (4-cylinder 4-valve operation shown in FIG. 13). Therefore, the throttle valve openings in the #3 cylinder and the #4 cylinder, in the #2 cylinder, and in the #1 cylinder are different, except for the fully opened time and the fully closed time of the throttle valve TH.

Therefore, according to the above-described embodiment, the throttle valve openings in the #3 cylinder and the #4 cylinder, in the #2 cylinder, and in the #1 cylinder are different, except for the fully opened time and the fully closed time of the throttle valve TH, and the throttle valve TH in the next cylinder group is opened before the throttle valve opening in the former cylinder group reaches the fully opened state. Therefore, as compared to the case where the throttle valves in all cylinder groups are simultaneously opened to thereby increase the output, the engine E can be operated with high combustion efficiency, which can contribute to improvement of fuel consumption. Among others, since the throttle valve in the next cylinder group is opened before the throttle valve opening in the former cylinder group reaches the fully opened state, it is possible to eliminate the step in output, and to realize a smooth operation.

In addition, in this embodiment, the average of the increase ratio (dTH/dθg) of the throttle valve opening to the handgrip opening in the #3 cylinder and the #4 cylinder whose throttle valves are opened first is set higher than the average of the increase ratio of the throttle valve opening to the handgrip opening in the #2 cylinder whose throttle opening is next started to open. Further, the average of the increase ratio of the throttle valve opening to the handgrip opening in the #2 cylinder is set higher than that in the #1 cylinder whose throttle valve is next started to open. In other words, the increase ratio in a cylinder whose throttle valve is opened first at the time of starting the grip operation is set to be high, and the increase ratios in the cylinders whose throttle valves are thereafter opened sequentially are set to be gradually lowered. Referring to FIG. 13, the inclinations of the three lines are so set that the inclination is greater as the line is located on the more left side.

Therefore, since the increase ratio is high in a low load range, by bringing the throttle valve opening to the fully opened state earlier, it is possible to operate in the range with a higher load factor, and to reduce the pumping loss, so that an improvement in fuel consumption can be contrived.

Since specified valves are rested and 2-valve operation is conducted at a low load time, it is possible, at the low load time, to limit the intake air amount and bring the throttle valve to the fully opened state earlier, and thereby to generate an intake swirl. As a result, the engine can be operated in a high load factor range which is advantageous in view of improvement of fuel consumption. In short, a swirl can be easily generated in the cylinder by the first intake valve 461 and the first exhaust valve 471 which are disposed on a diagonal line or by the second intake valve 462 and the second exhaust valve 472 which are disposed on a diagonal line.

Since it is possible to perform an independent throttle valve control on the basis of each cylinder group by use of independent throttle valves, the need for a high response performance in driving the throttle valve TH is eliminated, and output variations at the time of changing over the number of operative cylinders can be suppressed. Additionally, the need for performing an output variation suppressing control according to other controlled variable(s) is eliminated, and the control is simplified.

Further, since the number of cylinders is varied based on at least the handgrip opening θg, the fuel consumption can be improved while achieving an output demanded by the driver, by reading the driver's intention from the operation variable.

In addition, since the number of cylinders can be varied according to not only the grip operation but also the engine speed Ne, it is possible to appropriately enhance the load factor of each cylinder, and to achieve compatibility between engine output and fuel consumption. Additionally, in a range where the handgrip opening θg is small and the engine speed Ne is high, specifically, at the time of engine brake when the engine speed is not less than the threshold value α or the like times, the number of operative cylinders is four, so that an appropriate engine brake can be secured.

Further, since cylinder rest can be realized by resting the intake valves 461, 462 and the exhaust valves 471, 472, the pumping loss can be reduced, and an improvement in fuel consumption can be contrived. In addition, since the number of operative ones of the intake valves 461, 462 and the exhaust valves 471, 472 can be changed over according to the engine speed Ne, the output can be made appropriate. Additionally, since the motors 21A, 21B, the throttle valve position sensor 22 and the like which are driven and controlled by the ECU 70 are provided for each of the cylinder groups, the output variations at the time of changing over the valves can be suppressed.

In addition, since the secondary air introduction valve AI is provided between the adjacent exhaust valves 471, 472 of the two adjacent cylinders, the layout position of the secondary air introduction valve AI can be made compact.

Additionally, since it is possible to operate in a range where the load factor of each cylinder is high by increasing the number of cylinders from two cylinders by one cylinder at a time, fuel consumption can be improved also from this point of view.

The present invention is not limited to the above-described embodiment; while the invention has been described taking a motorcycle as an example, it can be applied also to four-wheeled vehicles. In that case, acceleration pedal opening can be used in place of handgrip opening. In addition, the present invention is not limited to 4-cylinder engine, and the combination of cylinders and the number of cylinder groups can be set freely; for example, the invention is applicable to a 6-cylinder engine, where three of the cylinders constitute a cylinder group, two of the cylinders constitute another cylinder group, and the remaining one of the cylinders singly constitutes a cylinder group. The above-mentioned valve stop mechanism is a mere example, and a valve stop mechanism of the type in which valve rest is achieved by use of a rocker arm can be adopted. Additionally, all cylinders may be put into all valve rest. Further, while the description has been made of the case where 4-cylinder operation is established when the engine speed Ne in 2-cylinder operation has exceeded the threshold value $\alpha$, various modes can be adopted; for example, transition from 2-cylinder operation to 3-cylinder operation and further to 4-cylinder operation according to the engine speed Ne may be adopted.

While a working example of the present invention has been described above, the present invention is not limited to the working example described above, but various design alterations may be carried out without departing from the present invention as set forth in the claims.

What is claimed is:

1. An internal combustion engine capable of selectively and temporarily disabling one or more cylinders during low-load operation thereof, said engine comprising a plurality of cylinders, at least some of said cylinders configured to be capable of selectively resting during engine operation, wherein
said cylinders are divided into a plurality of cylinder groups, and
each cylinder is provided with a throttle valve which is capable of being actuated in response to a throttle operation by a driver,
wherein the engine further comprises
a cylinder control unit for selecting cylinder groups to be operative or inoperative at a given time, according to at least a throttle operation, and
a throttle valve control mechanism for each of said cylinder groups, which permits full closure of the throttle valves of the inoperative cylinders, and
wherein each cylinder is provided with four or more valves, and each cylinder comprises at least one valve stop mechanism, the valve stop mechanism capable of transitioning a selected operable cylinder into a resting state by effecting an all-valve stop condition in which all of the valves of said selected cylinder are stopped, and wherein a partial valve stop operation can be conducted by stopping only some of the valves of the selected cylinder.

2. The internal combustion engine of claim 1, wherein said cylinder control unit is operable to increase a number of operative cylinder groups when at least some of said cylinder groups are inoperative, and when the engine speed is at or above a predetermined value.

3. The internal combustion engine of claim 1, wherein a determination of whether to effect said partial valve stop operation is made according to engine speed.

4. The internal combustion engine of claim 1, wherein at the time of the partial valve stop operation, adjacent exhaust valves in two adjacent cylinders are selected as operative valves, and an exhaust device is provided between said adjacent exhaust valves.

5. The internal combustion engine of claim 1, wherein four cylinders are provided, and an initial number of operative cylinders is two, and the number of operative cylinders is capable of being subsequently increased one cylinder at a time, based on a sensed throttle operation amount.

6. The internal combustion engine of claim 1, wherein each cylinder has four or more valves, and each cylinder comprises at least one valve stop mechanism, the valve stop mechanism capable of transitioning a selected operable cylinder into a partially operable state or a resting state during engine operation, by temporarily interrupting an open-and-close action of at least one valve of each cylinder.

7. The internal combustion engine of claim 1, wherein each cylinder has plural valves, and each cylinder comprises at least one valve stop mechanism, a valve stop mechanism operatively connected to a single valve, wherein
each valve comprises a valve stem and a valve lifter, the valve lifter supported by a body of the engine and comprising a cylinder having a closed upper end and a passage formed therein and aligned with an axial direction of the valve stem,
an end of the valve stem is received within the passage formed in the valve lifter,
the valve stop mechanism is disposed within the valve lifter adjacent to the closed upper end, the valve stop mechanism comprising:
a substantially spool-shaped pin holder having a slide hole formed therein substantially transverse to the axis direction of the valve stem,
a sliding pin disposed within the slide hole of the pin holder and slidably reciprocally movable therein in a direction substantially transverse to the axis direction of the valve stem, the sliding pin having a through channel formed therethrough and capable of being aligned in parallel to the axis direction of the valve stem, such that
when the valve stop mechanism is operated to stop valve operation, the sliding pin is positioned within the valve lifter such that the passage is aligned with the through channel, permitting the upper end of the valve stem to be received in both the valve lifter passage and the through channel of the sliding pin, thereby preventing the valve lifter from lifting the valve, and
when the valve stop mechanism is operated to temporarily interrupt valve operation, the sliding pin is positioned within the valve lifter to a position in which the through channel thereof is out of alignment with the upper end of the valve stem, and the valve stem resides only within the valve lifter passage and is prevented from entering the through channel of the sliding pin, thereby permitting the valve lifter to lift the valve.

8. A control system for an internal combustion engine of a vehicle, the vehicle comprising an internal combustion engine actuated by a throttle actuator, the internal combustion engine comprising a plurality of cylinders, at least some of the plurality of cylinders configured to be selectively inoperative during engine operation, wherein
each cylinder is provided with an independent throttle valve actuated by a throttle operation of a driver,
all cylinders are divided into a plurality of cylinder groups, each cylinder group provided with a corresponding throttle control mechanism,
each cylinder is provided with four or more valves, and each cylinder comprises at least one valve stop mechanism,
wherein the engine further comprises
a controller for determining the number of operative cylinder groups in use during operation of the engine,
a sensor for sensing the amount of operation of the throttle actuator, wherein the number of operative cylinder groups is selected according to at least the amount of operation of the throttle actuator,
wherein the controller controls each valve stop mechanism according to engine speed in order to permit transitioning of a selected operable cylinder into either
a resting state by effecting an all-valve stop condition in which all of the valves of said selected cylinder are stopped or
a partial valve stop state by stopping only some of the valves of the selected cylinder.

9. The control system for an internal combustion engine of claim 8, wherein the engine further comprises a sensor for sensing the engine speed, and
wherein the number of operative cylinder groups is selected by the controller according to the amount of operation of the throttle actuator and based on whether the engine speed is higher than a predetermined threshold value.

10. The control system for an internal combustion engine of claim 9, wherein the cylinder groups comprise a first cylinder group comprising two cylinders, a second cylinder group comprising one cylinder, and a third cylinder group comprising one cylinder,
wherein
when the engine speed is lower than the predetermined threshold, and the amount of operation of the throttle actuator is in the range of zero to a first predetermined value, the number of operative cylinder groups is selected by the controller to be one, the one selected operative cylinder group comprising the first cylinder group operated using a partial valve stop operation.

11. The control system for an internal combustion engine of claim 10, wherein when the engine speed is lower than the predetermined threshold, and the amount of operation of the throttle actuator is in the range between the first predetermined value and a second predetermined value, the number of operative cylinder groups is selected by the controller to be two, the two selected operative cylinder groups comprising the first cylinder group and the second cylinder group, both groups operated using a partial valve stop operation.

12. The control system for an internal combustion engine of claim 11, wherein when the engine speed is lower than the predetermined threshold, and the amount of operation of the throttle actuator is in the range between the second predetermined value and a third predetermined value, the number of operative cylinder groups is selected by the controller to be three, the three selected operative cylinder groups comprising a partial valve stop operation.

13. The control system for an internal combustion engine of claim 12, wherein when the engine speed is at least the predetermined threshold, the number of operative cylinder groups is selected by the controller to be three, the three selected operative cylinder groups comprising no valve stop operation.

14. An method of selectively and temporarily disabling one or more cylinders of an internal combustion engine during low-load operation thereof, said engine comprising a plurality of cylinders, wherein
said cylinders are divided into a plurality of cylinder groups;
each of said cylinders is provided with at least one intake valve and at least one exhaust valve;
each cylinder is provided with an associated throttle valve which is capable of being actuated in response to a throttle operation by a driver,
and each cylinder is provided with at least four valves and wherein each cylinder comprises at least one valve stop mechanism, the valve stop mechanism capable of transitioning a selected operable cylinder into a resting state by effecting an all-valve stop condition in which all of the valves of said selected cylinder group are stopped, and wherein a partial valve stop operation can be conducted by stopping only some of the valves of the selected cylinder,
said method comprising the steps of:
sensing an instantaneous throttle actuation level requested by a driver at a given time;
operating the throttle valve of at least one of said cylinder groups in proportion to said sensed throttle actuation level;
inactivating a throttle valve associated with at least one selected cylinder group of said cylinder groups, and temporarily interrupting operation of the intake and exhaust valves of said selected cylinder group via corresponding valve stop mechanisms when said sensed throttle actuation level is below a predetermined threshold; and
reactivating the throttle valve associated with the selected cylinder group and resuming operation of the intake and exhaust valves of said selected cylinder group when the sensed throttle actuation level exceeds the predetermined threshold.

15. The method of claim 14, further comprising a step of increasing a number of operative cylinder groups with a cylinder control unit when at least some of said cylinder groups are inoperative, when the sensed throttle actuation level exceeds the predetermined threshold and when the engine speed is at or above a predetermined value.

16. The method of claim 14, wherein a determination of whether to effect said partial valve stop operation is made according to engine speed.

17. The method of claim 14, wherein at the time of the partial valve stop operation, adjacent exhaust valves in two adjacent cylinders are selected as operative valves, and an exhaust device is provided between said adjacent exhaust valves.

18. The method of claim 14, wherein four cylinders are provided, wherein an initial number of operative cylinders is two, and wherein the number of operative cylinders is subsequently increased one cylinder at a time, based on the sensed throttle actuation level.

19. The method of claim 14, wherein each cylinder has plural valves, and each cylinder comprises at least one valve stop mechanism, a valve stop mechanism operatively connected to a single valve, wherein
each valve comprises a valve stem and a valve lifter, the valve lifter supported by a body of the engine and comprising a cylinder having a closed upper end and a passage formed therein and aligned with an axial direction of the valve stem,
an end of the valve stem is received within the passage formed in the valve lifter,
the valve stop mechanism is disposed within the valve lifter adjacent to the closed upper end, the valve stop mechanism comprising:

a substantially spool-shaped pin holder having a slide hole formed therein substantially transverse to the axis direction of the valve stem, a sliding pin disposed within the slide hole of the pin holder and slidably reciprocally movable therein in a direction substantially transverse to the axis direction of the valve stem, the sliding pin having a through channel formed therethrough and capable of being aligned in parallel to the axis direction of the valve stem, such that when the valve stop mechanism is operated to stop valve operation, the sliding pin is positioned within the valve lifter such that the passage is aligned with the through channel, permitting the upper end of the valve stem to be received in both the valve lifter passage and the through channel of the sliding pin, thereby preventing the valve lifter from lifting the valve, and when the valve stop mechanism is operated to temporarily interrupt valve operation, the sliding pin is positioned within the valve lifter to a position in which the through channel thereof is out of alignment with the upper end of the valve stem, and the valve stem resides only within the valve lifter passage and is prevented from entering the through channel of the sliding pin, thereby permitting the valve lifter to lift the valve.

\* \* \* \* \*